US012626177B2

(12) United States Patent
Lechner

(10) Patent No.: US 12,626,177 B2
(45) Date of Patent: May 12, 2026

(54) QUANTUM OPERATION CONTROL LAYOUT FOR A QUANTUM COMPUTATION

(71) Applicant: PARITY QUANTUM COMPUTING GMBH, Innsbruck (AT)

(72) Inventor: Wolfgang Lechner, Rum (AT)

(73) Assignee: PARITY QUANTUM COMPUTING GMBH, Innsbruck (AT)

( * ) Notice: Subject to any disclaimer, the term of this patent is extended or adjusted under 35 U.S.C. 154(b) by 717 days.

(21) Appl. No.: 18/013,071

(22) PCT Filed: Jul. 9, 2020

(86) PCT No.: PCT/EP2020/069416
§ 371 (c)(1),
(2) Date: Dec. 27, 2022

(87) PCT Pub. No.: WO2022/008057
PCT Pub. Date: Jan. 13, 2022

(65) Prior Publication Data
US 2023/0274175 A1 Aug. 31, 2023

(51) Int. Cl.
*G06N 10/40* (2022.01)
(52) U.S. Cl.
CPC .................................... *G06N 10/40* (2022.01)
(58) Field of Classification Search
USPC ........................................................ 716/100
See application file for complete search history.

(56) References Cited

U.S. PATENT DOCUMENTS

| | | |
|---|---|---|
| 2015/0046681 A1 | 2/2015 | King |
| 2017/0091650 A1* | 3/2017 | King ...................... G06N 10/40 |
| 2019/0296211 A1 | 9/2019 | Chow et al. |

FOREIGN PATENT DOCUMENTS

| | | |
|---|---|---|
| EP | 3113084 A1 | 1/2017 |
| JP | 2018529142 A1 | 10/2018 |

(Continued)

OTHER PUBLICATIONS

Examination Report in connection to Japanese application No. 2023-501053, dated Aug. 27, 2024.

(Continued)

*Primary Examiner* — Brian Ngo
(74) *Attorney, Agent, or Firm* — Meunier Carlin & Curfman LLC

(57) ABSTRACT

A method of determining a quantum operation control layout for a quantum computation on a quantum system is provided. The quantum computation is to be carried out on constituents of the quantum system arranged in accordance with a mesh. Vertices of the mesh represent possible sites for the constituents of the quantum system. Each cell of the mesh indicates that quantum interactions between constituents of the quantum system arranged in that cell are possible during the quantum computation. The method includes providing a data set including data representing hyperedges of a hypergraph. The method includes determining a set of generalized cycles. The method includes determining a mesh mapping that maps data representing the hyperedges of the hypergraph or of the enlarged hypergraph to the vertices of the mesh. The method includes generating the quantum operation control layout. The quantum operation control layout includes data indicating layout vertices of the mesh.

16 Claims, 6 Drawing Sheets

(56)                     References Cited

FOREIGN PATENT DOCUMENTS

| WO | 2020047444 | A1 | 3/2020 |
| WO | 20200156680 | A1 | 8/2020 |
| WO | 20200259813 | A1 | 12/2020 |

OTHER PUBLICATIONS

International Search Report and Written Opinion in Application No. PCT/EP2020/069416, mailed Mar. 31, 2021, 14 pages.

Li, Gushu et al: "Tackling the Qubit Mapping Problem for NISQ-Era Quantum Devices", Architectural Support for Programming Languages and Opera TI NG Systems, ACM, 2 Penn Plaza, Suite 701, New York, NY 10121-0701USA, Apr. 4, 2019 (Apr. 4, 2019), pp. 1001-1014, XP058433505.

Rocchetto, Andrea et al: "Stabilizers as a design tool for new forms of the Lechner-Hauke-Zoller annealer", Science Advances, vol. 2, No. 10, Oct. 21, 2016 (Oct. 21, 2016), pp. e1601246-e1601246, XP055381138,.

Ding, Yongshan et al: "Magic-State Functional Units: Mapping and Scheduling Multi-Level Distillation Circuits for Fault-Tolerant Quantum Architectures", arxiv.org, Cornell University Library, 201 Olin Library Cornell University Ithaca, NY 14853, Sep. 5, 2018 (Sep. 5, 2018), XP081079065.

* cited by examiner

Fig. 1
Fig. 2
Fig. 3
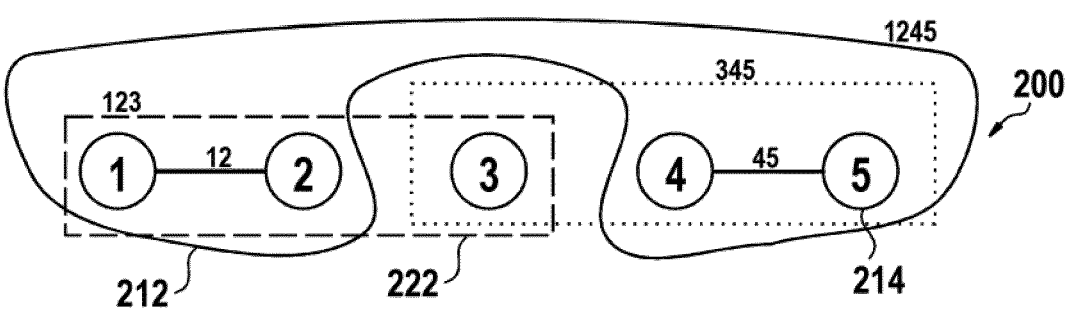
Fig. 4
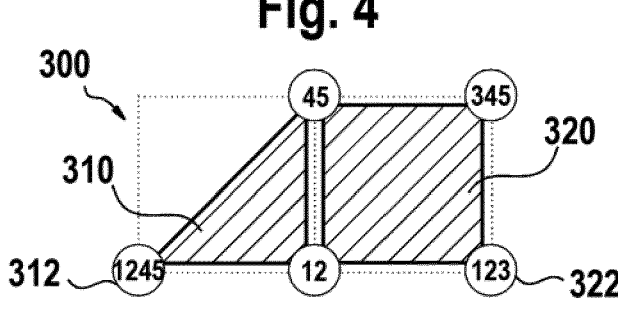
Fig. 5
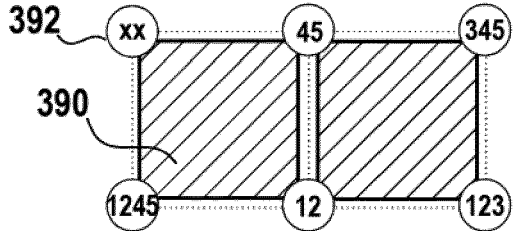

Fig. 6
201
Fig. 7
101
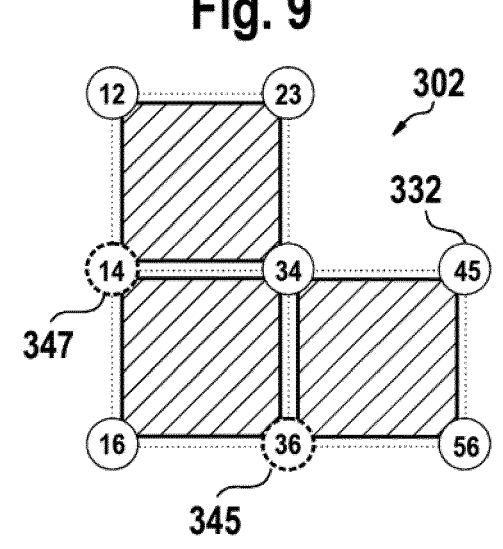
Fig. 8
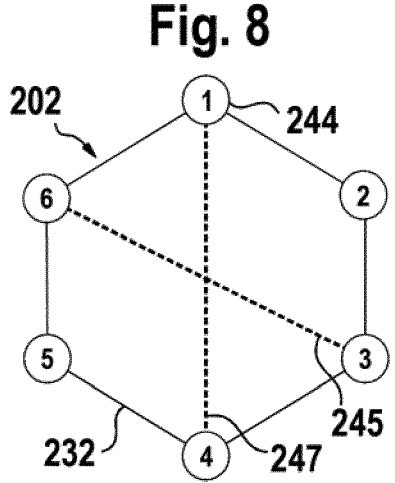
Fig. 9

QUANTUM OPERATION CONTROL LAYOUT FOR A QUANTUM COMPUTATION

CROSS REFERENCE TO RELATED APPLICATIONS

This application is a United States National Phase Patent Application of International Patent Application Number PCT/EP2020/069416, filed on Jul. 9, 2020, and incorporates by reference herein the same in its entirety.

FIELD

Embodiments described herein relate to a method of determining a quantum operation control layout for a quantum computation on a quantum system, to the quantum operation control layout itself, to a computer program product including the quantum operation control layout, and to a method of performing the quantum computation on the quantum system using the quantum operation control layout. Further embodiments are directed to systems for determining the quantum operation control layout for the quantum computation on a quantum system and/or for performing the quantum computation on the quantum system using the quantum operation control layout, in particular systems configured to carry out the methods described herein, and to uses of the systems.

BACKGROUND

Computing devices based on classical information processing, i.e., computing devices not making use of quantum mechanical effects, once started out as hard-wired calculators which could only perform specific operations. The transition to fully programmable computers revolutionized the field and started the information age. Currently, quantum computing devices, i.e., computing devices which, possibly in addition to using classical information processing, make use of quantum mechanical effects to solve computational problems, are still mostly in stages comparable to those of hard-wired calculators in that they can only tackle computational problems for which they are particularly designed.

EP 3 113 084 A1 describes a method and apparatus for solving computational problems using a quantum system. This quantum computing method/apparatus receives a computational problem, in particular an NP hard computational problem or an NP complete computational problem, such as the (classical) Ising spin model with N spins and all-to-all pairwise interactions. The quantum method/apparatus encodes the computational problem into a single-body problem Hamiltonian of the quantum system with adjustable parameters. For instance, in the case of the (classical) Ising spin model with N spins and all-to-all pairwise interactions between the N spins, each term of the single-body problem Hamiltonian may be regarded as corresponding to one of the pairwise interactions, and so there are $N(N-1)/2$ single-body terms of the problem Hamiltonian acting on a corresponding number of quantum bits (qubits) of the quantum system, and there is a like number of adjustable parameters. The qubits of the quantum system represent the parity of the spins of the Ising spin model, wherein the state $|0\rangle$ indicates anti-parallel alignment of the corresponding spins of the Ising spin model, and the state $|1\rangle$ indicates parallel alignment.

In addition, a short-range Hamiltonian is provided in EP 3 113 084 A1 to compensate for the increased number of degrees of freedom of the quantum system as compared to the Ising spin model, the short-range Hamiltonian being a sum of at least $N(N-1)/2-N$ constraint Hamiltonians, wherein each constraint Hamiltonian acts with a constraint strength C on at most four qubits forming a plaquette of a square lattice that contains the qubits of the quantum system. The constraint Hamiltonians ensure consistency with the Ising spin model in that they enforce the presence of an even number (zero, two, etc.) of states $|0\rangle$ within subsets of qubits that correspond to spins with anti-parallel alignment in closed loops over spins in the Ising spin model.

The ground state of a final Hamiltonian being the sum of the problem Hamiltonian and of the short-range Hamiltonian, or at least a thermal state close to that ground state, contains information about a solution to the computational problem that is encoded in the parameters of the problem Hamiltonian. Measuring the quantum system in such a state can reveal information about the solution to the computational problem. The ground state of the final Hamiltonian, or thermal state close to the ground state, can be reached by quantum annealing, i.e. an adiabatic sweep from the ground state of an initial Hamiltonian to the ground state of the final Hamiltonian as described in EP 3 113 084 A1. Alternatively, the ground state may be reached by counter-diabatic driving using a Hamiltonian with an additional counter-diabatic part as described in PCT/EP2019/066916. The adiabatic quantum computation and the counter-diabatic quantum computation can both be regarded as an analog quantum computation. A digital version of the quantum computation using quantum gates is described in PCT/EP2019/052528. A state approximating the ground state of the final Hamiltonian can be reached by a sequence of unitary operators acting on an initial state, wherein the unitary operators are propagators of the initial Hamiltonian, problem Hamiltonian and short range-Hamiltonian, wherein the sequence of unitary operators and their parameters can be optimized using a classical feedback algorithm, and wherein the unitary operators can be implemented by a vastly parallelizable application of quantum gates acting locally or on nearest neighbors of qubits in a square lattice.

Since the (classical) computational problem is encoded in the parameters of the problem Hamiltonian, these methods and apparatuses provide for a fully programmable quantum computing architecture, in contrast to the hard-wired quantum computing devices. The quantum computing architecture is also scalable. However, the scaling can be resource-demanding. For instance, when the number N of spins of the (classical) Ising spin model grows, the size of the quantum system (number of qubits) grows quadratically with N. In addition, EP 3 113 084 A1 describes that its method/apparatus can be applied to Ising spin models with three-body interactions, to be implemented in a three-dimensional lattice for the qubits of the quantum system, and mentions that the method/apparatus could be generalized to d-body interactions. Quantum operations on a quantum system of qubits arranged on a three-dimensional lattice may be possible, yet could be difficult to perform. Moreover, d-body interactions would lead to an implementation in even higher-dimensional lattices following the teaching of EP 3 113 084 A1, and this can be impractical due to the limited number of spatial dimensions of our world.

Therefore, there is a need for improvement.

SUMMARY

According to an embodiment, a method of determining a quantum operation control layout for a quantum computation on a quantum system is provided. The quantum computation is to be carried out on constituents of the quantum system arranged in accordance with a mesh. Vertices of the mesh represent possible sites for the constituents of the quantum system. Each cell of the mesh indicates that quantum interactions between constituents of the quantum system arranged in that cell are possible during the quantum computation. The method includes providing a data set including data representing hyperedges of a hypergraph. The method includes determining a set of generalized cycles. The generalized cycles contain hyperedges of the hypergraph or contain hyperedges of an enlarged hypergraph. The enlarged hypergraph at least includes the hyperedges of the hypergraph and an additional hyperedge. Therein, a maximal length of generalized cycles of the set of generalized cycles is not greater than a maximal vertex number of the cells of the mesh. The method includes determining a mesh mapping that maps data representing the hyperedges of the hypergraph or of the enlarged hypergraph to the vertices of the mesh. Therein, each generalized cycle of a constraining subset of the set of generalized cycles consists of hyperedges mapped to a cell of the mesh. The method includes generating the quantum operation control layout. The quantum operation control layout includes data indicating layout vertices of the mesh. Each layout vertex corresponds to a hyperedge mapped according to the mesh mapping. The quantum operation control layout includes data indicating layout vertex sets. Each layout vertex set consists of layout vertices within a cell of the mesh that correspond to a generalized cycle of the constraining subset of generalized cycles.

According to other embodiments, a quantum operation control layout for a quantum computation on a quantum system, or a computer program product comprising the quantum operation control layout, is provided. The quantum computation is to be carried out on constituents of the quantum system arranged in accordance with a mesh. Vertices of the mesh represent possible sites for the constituents of the quantum system. Each cell of the mesh indicates that quantum interactions between constituents of the quantum system arranged in that cell are possible during the quantum computation. The quantum operation control layout includes data indicating layout vertices of the mesh, and data indicating layout vertex sets. Each layout vertex set consists of layout vertices within a cell of the mesh. The layout vertices may correspond to hyperedges of a hypergraph or of an enlarged hypergraph mapped to the layout vertices according to a mesh mapping, wherein layout vertices of each layout vertex set correspond to hyperedges forming a generalized cycle of the hypergraph or of the enlarged hypergraph.

According to a further embodiment, a method of performing a quantum computation on a quantum system is provided, wherein the quantum computation is to be carried out on constituents of the quantum system arranged in accordance with a mesh. Vertices of the mesh represent possible sites for the constituents of the quantum system. Each cell of the mesh indicates that quantum interactions between constituents of the quantum system arranged in that cell are possible during the quantum computation. The method includes providing a quantum operation control layout. The quantum operation control layout includes data indicating layout vertices of the mesh, and data indicating layout vertex sets. Each layout vertex set consists of layout vertices within a cell of the mesh. The layout vertices may correspond to hyperedges of a hypergraph mapped to the layout vertices according to a mesh mapping, wherein layout vertices of each layout vertex set correspond to hyperedges forming a generalized cycle of the hypergraph. The method includes providing the constituents of the quantum system in a spatial arrangement such that there is a constituent for every layout vertex of the mesh and such that, for each layout vertex set, quantum interactions are possible between constituents corresponding to layout vertices of that layout vertex set. The method includes applying, for each layout vertex associated with a non-zero weight, a local field to the constituent corresponding to that layout vertex. The method includes performing, for each layout vertex set, quantum interactions between constituents corresponding to the layout vertices of that layout vertex set. The method includes measuring some or all of the constituents of the quantum system.

Embodiments are also directed to methods for operating the systems described herein, and to the use of the systems to perform the methods according to the embodiments described herein.

Further advantages, features, aspects and details that can be combined with embodiments described herein are evident from the dependent claims, the description and the drawings.

BRIEF DESCRIPTION OF THE DRAWINGS

A full and enabling disclosure to one of ordinary skill in the art is set forth more particularly in the remainder of the specification including reference to the accompanying drawings wherein:

FIGS. 1-2 show a mesh, which may be used in embodiments described herein;

FIGS. 3, 6, 10, and 12 show a hypergraph, which may be used in embodiments described herein;

FIG. 8 shows an enlarged hypergraph, which may be used in embodiments described herein;

FIGS. 4-5, 7, 9, 11, 14, 17 and 19 show quantum operation control layouts for a quantum computation according to, resulting from, or for use in, embodiments described herein;

FIGS. 20-21 show systems for solving a computational problem, a system for determining a quantum operation control layout for a quantum computation, and a system for performing a quantum computation according to embodiments described herein;

DETAILED DESCRIPTION

Figure 10:
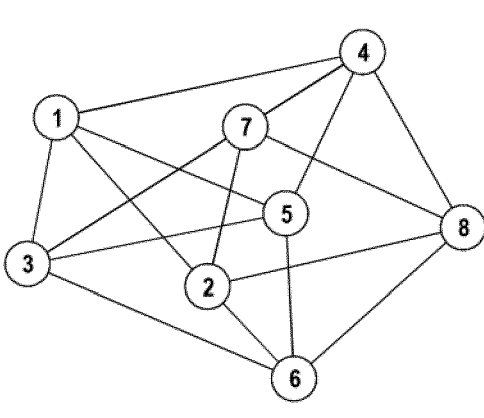

Reference will now be made in detail to the various exemplary embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

Within the description of the drawings, the same reference numbers refer to the same or similar components. Generally, only the differences with respect to the individual embodiments are described. The structures shown in the drawings are not necessarily depicted true to scale, and may contain details drawn in an exaggerated way to allow for a better understanding of the embodiments.

Some embodiments described herein relate to a method of determining a quantum operation control layout for a quantum computation on a quantum system.

Information about the Quantum System

The quantum system has constituents, which can specifically be physical qubits. The constituents of the quantum system may be arranged in accordance with a mesh. The mesh may be a two-dimensional mesh. The mesh may be embeddable in a two-dimensional manifold, such as in a plane. The vertices of the mesh represent possible sites for the constituents of the quantum system. Each cell of the mesh indicates that quantum interactions between constituents of the quantum system arranged in that cell during the quantum computation are possible. The cells may be two-dimensional. A cell may have a boundary that may be visualized as a closed polyline (closed polygonal chain) between the vertices of the cell when mapped to the manifold, wherein polyline is a connected series of line segments where the last line segment of the series connects back to the first line segment of the series. Vertices and a portion of the boundary may be be shared between neighboring cells. The quantum operation control layout can indicate layout vertices to be occupied by constituents of the quantum system during the quantum computation, and sets of layout vertices indicating interactions to be performed between the layout vertices of each set during the quantum computation. The quantum operation control layout can control the quantum computation.

For instance, FIG. 1 shows a mesh 100 of five times five vertices and four times four cells. Each cell contains four vertices. The mesh of FIG. 1 is a quadrangular mesh. FIG. 1 could also be regarded as a piece of an infinite mesh of that form, i.e., a mesh of practically unlimited size. The cell 110 has vertices 111, 112, 113 and 114. A cell boundary 115 is represented here as a polyline in form of a square connecting the vertices 111, 112, 113 and 114. The cell 110 indicates that constituents of the quantum system, if they are arranged in the vertices 111, 112, 113 and 114 of that cell, could interact with each other during the quantum computation. The physical nature of the quantum system may dictate if, e.g., any three constituents and additionally also all four constituents arranged in that cell could interact, as in the digital, gate-based style of quantum computation, or if only all four constituents could interact with each other, as in some forms of analog quantum computation. The vertex number ($v_c$) of a cell (c) of the mesh is the number of vertices contained in that cell. The maximal vertex number ($v_{max}$) of the cells of the mesh is the maximum of the vertex numbers of the cells of the mesh $$\left(v_{\max} = \max_c v_c\right).$$

For instance, in the mesh shown in FIG. 1, the vertex number of each cell is four, and so the maximal vertex number of the cells of the mesh is four as well.

The mesh generally indicates, by its cells, which constituents of the quantum system can interact during the quantum computation when arranged on vertices of the mesh. The vertices of the mesh need not be associated with one fixed position in space. For instance, the mesh in FIG. 2 is the same as the mesh in FIG. 1 although, when viewed as geometric objects, the geometric object in FIG. 2 is sheared as compared to that of FIG. 1. If the mesh shall indicate concrete spatial positions that the constituents of the quantum system can occupy, then it is called a geometric mesh herein. A geometric mesh can be viewed as rigid, albeit potentially scalable. So, for a geometric mesh, the vertices cannot be "moved" by mapping them to different spatial positions by different mappings (embeddings), but are fixed by one concrete mapping.

Which constituents of a quantum system can interact or are designed to interact during a quantum computation can depend on the physical implementation. For instance, when qubits are arranged in a square lattice, shown as black dots in FIGS. 1 and 2, then in one physical implementation any plaquette of four qubits within a square of the lattice may be able to interact (FIG. 1, indicated by the star-like shape in the top right), while in another physical implementation any four qubits within a parallelogram may be able to interact by nearest neighbor interactions within the square lattice (FIG. 2, shown with black lines and a square in the top right, wherein the black lines may stand for CNOT gates and the black square for a local field). This makes no difference for the mesh and its vertices and cells, and also makes no difference for the quantum operation control layout indicating the layout vertices and layout vertex sets involved in the quantum computation, which can be applied to both physical implementations.

The mesh provides physical information about the quantum system, in particular about which constituents can interact with which other constituents during the quantum computation. Since quantum interactions in many physical implementations are only realizable between constituents that are close to each other (short-range interactions), the mesh and particularly its cells can in this case be viewed as reflecting what is close or short-ranged in the quantum system. The method of determining the quantum operation control layout for the quantum computation on the quantum system explicitly or implicitly considers the mesh and the physical information about the quantum system contained therein. For an explicit consideration, data about the structure and/or size of the mesh may be passed as input to the method. Alternatively, the method may implicitly assume a specific structure and/or size of the mesh.

Input

Many computational problems of interest, among them NP-hard optimization problems but also NP-complete decision problems, can be mapped to an Ising spin model, the decision form of which is NP-complete itself. Specifically, such problems may be mapped to the problem of finding the ground state energy of the classical Hamiltonian function $$H(s_1, \ldots, s_N) = \sum_{i<j}^N J_{ij} s_i s_j + \sum_i^N h_i s_i$$

or of the corresponding quantum Hamiltonian operator $$H\left(\sigma_z^{(1)}, \ldots, \sigma_z^{(N)}\right) = \sum_{i<j}^N J_{ij} \sigma_z^{(i)} \sigma_z^{(j)} + \sum_i^N h_i \sigma_z^{(i)},$$

wherein the Ising spin model may involve long-range interactions. A distinction between the classical and the quantum version of spin models need not be made herein, and only the quantum Hamiltonian operators will be specified and called "Hamiltonian" for brevity.

Many of the aforementioned computational problems map more naturally, i.e., with decreased number of spins, to spin models which do not only involve pairwise interactions, but which involve k-body interactions with k larger than two as well. That is, the computational problem at hand may be rephrased (mapped to) the problem of finding the ground state energy of the spin model Hamiltonian $$H\left(\sigma_z^{(1)}, \ldots, \sigma_z^{(N)}\right) = \sum_i^N h_i \sigma_z^{(i)} + \sum_{i<j}^N J_{ij} \sigma_z^{(i)} \sigma_z^{(j)} +$$
$$\sum_{i<j<k}^N R_{ijk} \sigma_z^{(i)} \sigma_z^{(j)} \sigma_z^{(k)} + \sum_{i<j<k<l}^N T_{ijkl} \sigma_z^{(i)} \sigma_z^{(j)} \sigma_z^{(k)} \sigma_z^{(l)} + \cdots ,$$

wherein the spin model Hamiltonian contains k-body interactions with k being larger than one and smaller than or equal to N, and may contain k-body interactions with k being larger than two. The vector h, matrix J, and tensors R, T, etc. contain weights of the k-body interactions, indicating the interaction strengths. The number K shall stand for the number of non-zero weights, which specifies the number of summand terms in the spin model Hamiltonian. The non-zero weights may be integer numbers, e.g., all being 1 or −1, or may be arbitrary real numbers.

The number of terms of the spin model Hamiltonian grows quadratically in N when there are all-to-all interactions and single-body and two-body interactions, and would grow exponentially in N if there were all-to-all interactions and k-body interactions for all k from 1 to N. But for many computational problems, the number K of terms in the spin model Hamiltonian grows much slower in N than that. For a given N, the number K may particularly be smaller than $$\binom{N}{2} = N(N-1)/2.$$

The vector h, matrix J, and tensors R, T, etc. may be sparse.

The spin model Hamiltonian with k-body interactions can be associated with a hypergraph having N nodes and K hyperedges. The hypergraph may be simple, i.e., have no multiple hyperedges containing the same nodes. A hyperedge is a non-empty set with elements from the set of N nodes. A hypergraph can be considered as a pair (X, E), where X is the set of nodes (node set) and E is the set of hyperedges (hyperedge set). In the correspondence with the spin model, a hyperedge indicates a k-body interaction between spins, where k is the cardinality of the hyperedge, i.e., the number of elements in the non-empty subset of the N nodes. If a hypergraph is 2-uniform, i.e., if the hypergraph only contains hyperedges that are edges (meaning the cardinality of all hyperedges is two), then the hypergraph is a graph. The hypergraph can be connected, i.e., starting from any node, all other nodes can be reached by following hyperedges. If the hypergraph is not connected, the method can be independently applied to every connected component. A hypergraph that is not connected can be associated with a spin model Hamiltonian that is separable.

As an example, FIG. 3 shows a hypergraph 200 with five nodes labeled with indices 1 . . . 5, of which the last one is exemplarily shown with reference sign 214 in FIG. 3. The nodes correspond to five spins. FIG. 3 shows five hyperedges, namely two hyperedges {1,2}, {4,5} which are edges (shown with black lines connecting the respective nodes), and three hyperedges {1,2,3}, {3,4,5}, {1,2,4,5} shown with boxes drawn around them. For illustration, the hyperedge {1,2,3} is shown with reference sign 222, and the hyperedge {1,2,4,5} with reference sign 212. The hypergraph shown in FIG. 3 can be regarded as being associated with the spin model Hamiltonian $$H = J_{12} \sigma_z^{(1)} \sigma_z^{(2)} + J_{45} \sigma_z^{(4)} \sigma_z^{(5)} +$$
$$R_{123} \sigma_z^{(1)} \sigma_z^{(2)} \sigma_z^{(3)} + R_{345} \sigma_z^{(3)} \sigma_z^{(4)} \sigma_z^{(5)} + T_{1245} \sigma_z^{(1)} \sigma_z^{(2)} \sigma_z^{(4)} \sigma_z^{(5)},$$

so the hyperedges of cardinality two correspond to two-body interactions between the spins associated with the nodes of the hypergraph, the hyperedges of cardinality three correspond to three-body interactions in the spin model Hamiltonian, and the hyperedge with cardinality four corresponds to a four-body interaction in the spin model Hamiltonian. The weights ($J_{12}$, $J_{45}$, $R_{123}$, $R_{345}$, $T_{1245}$) are not shown in FIG. 3, but can be associated with the hyperedges. The hypergraph can thus be a weighted hypergraph.

Data representing a hypergraph or the hyperedges of a hypergraph can be provided as input in the method of determining the quantum operation control layout for the quantum computation on the quantum system. The data represents the hypergraph if the hypergraph can be derived from the data, and represents the hyperedges if the hyperedges can be derived from the data. The data may be in some standard format that specifies the hyperedge set or the entire hypergraph, or may be in any arbitrary format. The hypergraph may be derivable from the hyperedge set, in particular if all nodes are contained in some hyperedge, which is specifically the case if the hypergraph is connected. For instance, in the example of FIG. 3 above, the graphical depiction, the description as sets, and the description by the spin model each allow the hypergraph to be derived, and qualify as data representing the hypergraph. Here, it is sufficient to provide the hyperedge set since the hyperedges jointly contain all nodes of the hypergraph and the depiction/description allows to identify the nodes within the hyperedges, so the entire hypergraph can be derived from the data representing the hyperedges of the hypergraph.

For the hyperedges of the hypergraph, for the hypergraph, and for the data representing the hyperedges or the hypergraph, there is a natural connection to the spin model with k-body interactions, but the computational problem need not have been encoded into a hypergraph by mapping the computational problem to the spin model first.

Determination of Generalized Cycles

A set of generalized cycles can be determined from the hyperedges of the hypergraph. A generalized cycle may be a regular generalized cycle or an irregular generalized cycle. The irregular generalized cycle is described later. A regular generalized cycle shall mean a set of hyperedges, wherein each node contained as an element in a hyperedge of the set of hyperedges appears an even number of times as an element within all hyperedges of the set of hyperedges combined. For instance, in the example of a hypergraph shown in FIG. 3, the set of hyperedges {{1,2,4,5},{1,2},{4, 5}} forms a regular generalized cycle because each of the nodes 1, 2, 4 and 5 that appears within one of the three hyperedges of the set appears two times within all of the three hyperedges. Also, the set of hyperedges {{4,5},{1,2}, {3,4,5},{1,2,3}} forms a regular generalized cycle because each of the nodes 1, 2, 3, 4 and 5 that appears within one of the four hyperedges of the set appears two times within all of the four hyperedges. Conversely, the set of hyperedges {{1,2},{1,2,3},{1,2,4,5},{3,4,5}} does not form a regular generalized cycle since each of the nodes 1 and 2 appearing in one of the hyperedges appears three times within all four hyperedges, i.e., an odd number of times. For a 2-uniform hypergraph, i.e., a graph, a regular generalized cycle becomes a cycle of the edges of the graph.

The length of a regular generalized cycle is the number of hyperedges of the regular generalized cycle, i.e., the cardinality of the set of hyperedges forming the regular generalized cycle. The maximal length of regular generalized cycles of a set of regular generalized cycles is the maximum of the lengths of these regular generalized cycles. The maximal length of regular generalized cycles of a set of regular generalized cycles determined in the method may be not greater than a maximal vertex number of the cells of the mesh. The set of regular generalized cycles determined in the method may include all regular generalized cycles of the hypergraph whose length is not greater than, i.e., smaller than or equal to, the maximal vertex number of the cells of the mesh. The determination of a set of regular generalized cycles therefore considers properties of the mesh, which itself reflects physical properties of the quantum system on which the quantum computation is to be performed.

Without wishing to be bound by any particular theory, the following is provided as an explanation of the significance of regular generalized cycles for the quantum computation to be performed on the quantum system. When viewed from the perspective of the spin model that can be associated with the hypergraph, a regular generalized cycle corresponds to specific interactions between particular spins. For illustration, firstly consider the 2-uniform hypergraph with node set {1,2,3} and edge set {{1,2},{2,3},{1,3}} (weights omitted). This 2-uniform hypergraph is a graph and has one regular generalized cycle of length three, namely {{1,2},{2,3},{1,3}}, which is a cycle of the graph. The associated spin model with spins labeled 1, 2, and 3 has the Hamiltonian $$H = \sigma_z^{(1)}\sigma_z^{(2)} + \sigma_z^{(2)}\sigma_z^{(3)} + \sigma_z^{(1)}\sigma_z^{(3)}$$

(weights omitted). In the quantum computation to be performed, hyperedges, respectively k-body spin interactions, are mapped to the constituents of the quantum system, in particular physical qubits, and the weights become local fields acting on these constituents. A physical qubit shall be in state |0> when the two spins it represents are antiparallel (uneven number of spin downs), and in state |1> when these two spins are parallel (even number of spin downs). Choosing "0" to denote spin down, and "1" to denote spin up for the spins of the spin model, then, for each physical qubit, the configurations 01 and 10 (odd number of zeros) of the corresponding spins are associated with state |0>, and the configurations 00 and 11 (even number of zeros) of the corresponding spins are associated with state |1>. But then, only an even number (zero or two) of the three physical qubits can be in the state |0> when consistency with the spin model is to be preserved.

To see this, consider original spins 1 and 2 to be in the configuration 01 (so physical qubit 1 representing the interaction between spins 1 and 2 or the corresponding hyperedge in the hypergraph is in state |0>), then original spins 2 and 3 can only be in the configurations 10 or 11 because the spin direction of the third qubit is the only one that can still be chosen. In the first case, physical qubit 2 representing the interaction between spins 2 and 3 or the corresponding hyperedge in the hypergraph is in state |0>. The state of physical qubit 3 representing the interaction between spins 1 and 3 is then already determined, because the spin configuration of spins 1 and 3 is fixed by the cyclic property to be 00, and so the state of physical qubit 3 is |1>. In the second case, physical qubit 2 is in state |1>, and the state of physical qubit 3 is determined, because the spin configuration of spins 1 and 3 is fixed by the cyclic property to be 01, and so the state of physical qubit 3 is |10>. For all other spin configurations, the number of physical qubits in state |0> is even as well.

Secondly, consider the hypergraph with node set {1,2,3} and edge set {{1},{2,3},{1,2,3}} (weights omitted). This hypergraph has one regular generalized cycle of length three, namely {{1},{2,3},{1,2,3}}. The associated spin model with spins labeled 1, 2, and 3 has the Hamiltonian $$H = \sigma_z^{(1)} + \sigma_z^{(2)}\sigma_z^{(3)} + \sigma_z^{(1)}\sigma_z^{(2)}\sigma_z^{(3)}$$

(weights omitted). In the quantum computation to be performed, the hyperedges, respectively k-body spin interactions, are again mapped to the constituents of the quantum system, in particular physical qubits, and the weights become local fields. Choosing "0" to denote spin down, and "1" to denote spin up for the spins of the spin model, a physical qubit shall be in state |0> when there is an odd number of spin downs/zeros in the spin configuration of spins it represents, and in state |1> when there is an even number of spin downs/zeros in that spin configuration. Again, only an even number (zero or two) of the three physical qubits can be in the state |0> when consistency with the spin model is to be preserved.

To see this, consider original spin 1 to be in the spin configuration 0. Physical qubit 1 representing the "interaction" (field) on spin 1 or the corresponding hyperedge in the hypergraph is then in state |0>. Original spins 2 and 3 can be in the spin configurations 01, 10 or else 00, 11. The first two configurations correspond to state |0> of physical qubit 2 representing the interaction between spins 2 and 3 or the corresponding hyperedge in the hypergraph. The last two configurations correspond to state |1> of physical qubit 2. The state of physical qubit 3 representing the interaction between spins 1, 2 and 3 is again already determined. In the first case the spin configuration of spins 1, 2 and 3 is fixed to be 001 or 010, and so the state of physical qubit 3 is |1> as there is an even number of spin downs/zeros in the spin configuration of the three spins. In the second case, the spin configuration of spins 1, 2 and 3 is 000 or 011, and so the state of physical qubit 3 is 10>. For all other spin configurations, the number of physical qubits in state |0> is even as well.

That means, only an even number (zero, two, etc.) of physical qubits can be in the state |0> when the physical qubits are associated with hyperedges of the hypergraph that form a regular generalized cycle. So, the regular generalized cycle imposes a constraint on the states of the constituents of the quantum system when consistency with the spin model is to be preserved, and therefore with the hypergraph encoding the computational problem. The regular generalized cycles whose maximal length is smaller than or equal to the maximal vertex number of the cells of the mesh impose constraints designed to be implemented in the quantum computation.

Determination of a Mesh Mapping

When mapping the hyperedges of the hypergraph, respectively the k-body interactions of the spin model associated with the hypergraph, to the constituents of the quantum system, in particular to physical qubits, and the weights/ interaction strengths to local fields acting on the constituents of the quantum system, the degrees of freedom of the quantum system are larger than those of the spin model. A constraint imposed by a regular generalized cycle of the hypergraph can reduce the degrees of freedom of the quantum system by one. Consistency between the states of the quantum system and the states of the spin model associated with the hypergraph is provided by a set of regular generalized cycles the regular generalized cycles of which impose constraints on the quantum system that reduce the degrees of freedom of the quantum system to the degrees of freedom of the spin model associated with the hypergraph. The term constraining subset of regular generalized cycles is used for a set of regular generalized cycles that provides this consistency. Therein, "subset" is used because this set is a subset of all regular generalized cycles of the hypergraph, and particularly a subset of the set of all regular generalized cycles whose maximal length is not greater than the maximal vertex number of the cells of the mesh. However, this does not imply that the set of all regular generalized cycles whose maximal length is not greater than the maximal vertex number of the cells of the mesh needs to be constructed, nor does it imply that the constraining subset is a proper subset thereof.

For instance, when the hypergraph has order N, i.e., the cardinality of the node set is N and the associated spin model typically has N spins/degrees of freedom, and when the hypergraph has size K, i.e., the cardinality of the hyperedge set is K, and so there are K terms in the Hamiltonian expressing k-body interactions between the spins, then the quantum system often has K degrees of freedom because its constituents represent the K hyperedges/k-body interactions. Then at least $K-N$ constraints imposed by regular generalized cycles of the hypergraph may provide the consistency. When the hypergraph has only hyperedges of even cardinality, meaning that k is even for all k-body interactions of the associated spin model, the ground state of the Hamiltonian of the spin model is degenerate since spin up and spin down can be interchanged (no energy gap between spin up/spin down). The quantum system does not exhibit this global symmetry, so another regular generalized cycle and imposed constraint is added in this case to a total of at least $K-N+1$. The constraining subset contains therefore at least $K-N$ or at least $K-N+1$ regular generalized cycles in this example. The constraining subset can contain more regular generalized cycles than that, but these additional regular generalized cycles do not further reduce the degrees of freedom because they would not be independent of the first $K-N$ or $K-N+1$ regular generalized cycles. Such over-constraining can be used to lower the energy in constraint Hamiltonians imposed on the quantum system, thus reducing a separation of energy scales between the energies of the constraint Hamiltonians and the energies of the local fields that form the problem Hamiltonian of the quantum system.

The method can include determining a mesh mapping that maps the hyperedges of the hypergraph, or data representing the hyperedges, to the vertices of the mesh. A vertex of the mesh to which a hyperedge is mapped is called a layout vertex. Layout vertices correspond to constituents of the quantum system used in the quantum computation. In the mesh mapping, each regular generalized cycle of the constraining subset consists of hyperedges that are mapped to a cell of the mesh. Mapping hyperedges to a cell of the mesh means mapping these hyperedges to vertices of only that cell. In this way, the constraints imposed by the regular generalized cycles can be physically implemented since the cell of the mesh indicates that quantum interactions between constituents arranged on vertices of that cell can interact during the quantum computation. The mesh mapping therefore takes the physical properties of the quantum system indicated by the mesh into account.

For instance, for a mesh as shown in FIGS. 1 and 2, each cell has four vertices, and so the maximal vertex number of cells in the mesh is four. In the example of FIG. 3, there are three regular generalized cycles of the hypergraph with length at most four, namely $\{\{1,2,4,5\},\{1,2\},\{4,5\}\}$, $\{\{1,2,4,5\},\{1,2,3\},\{3,4,5\}\}$, and $\{\{2,4\},\{1,5\},\{1,2,3\},\{3,4,5\}\}$. The mesh mapping can map the five hyperedges of the hyperedge set $\{\{1,2\},\{4,5\},\{1,2,3\},\{3,4,5\}, \{1,2,4,5\}\}$ to five different vertices of the mesh as shown in FIG. 4, wherein "12" is used as a label for the node to which the hyperedge $\{1,2\}$ is mapped, and so on. The mesh mapping is injective. In the mesh mapping, the regular generalized cycles $\{\{1,2,4,5\},\{4,5\},\{1,2\}\}$ and $\{\{1,2\},\{4,5\},\{1,2,3\},\{3,4,5\}\}$ form a constraining subset of the set of regular generalized cycles of maximal length not greater than four. There are N=5 nodes in the hypergraph and K=5 hyperedges, and there is a global symmetry despite the hyperedges of odd cardinality (exchanging all spin ups for spin downs and vice versa does not change the expected energy), and so $K-N+1=1$ regular generalized cycles would be sufficient. But two regular generalized cycles allow all hyperedges to be mapped and be contained in a regular generalized cycle in this example. As can be seen in FIG. 4, the hyperedges of any regular generalized cycle from the constraining subset are mapped within respective cells of the quadrangular mesh of FIG. 1 or 2, and each regular generalized cycle from the constraining subset is mapped to a different cell of the mesh.

The mesh mapping may be constructed by mapping the hyperedges of a first regular generalized cycle on vertices of a first cell of the mesh. When there is a second regular generalized cycle having at least one hyperedge in common with the first regular generalized cycle, the hyperedges of the second regular generalized cycle may be mapped on the vertices of a neighboring cell of the mesh. A neighboring cell of a first cell is a cell that has at least one vertex in common with the first cell. The at least one hyperedge that the second regular generalized cycle has in common with the first regular generalized cycle is mapped on a corresponding at least one vertex of the mesh common to the first cell and its neighboring cell. The process may be repeated. When the regular generalized cycles forming a constraining subset are all mapped on the mesh, the construction of the mesh mapping is done. In this way, the mesh mapping is constructed in a way that the condition is fulfilled that the hyperedges of any regular generalized cycle shall be mapped to vertices belonging to the same cell of the mesh.

Quantum Operation Control Layout

The method can include generating the quantum operation control layout. The quantum operation control layout can control the quantum operations of the quantum computation, e.g., when loaded into a quantum processing unit (QPU) of a quantum processing system. The quantum operation control layout may therefore be a control program for the quantum computation. The quantum operation control layout includes data indicating the layout vertices of the mesh. Each layout vertex corresponds to a hyperedge mapped according to the mesh mapping. For instance, regarding the example of FIG. 4, the five vertices labeled 1245, 45, 12, 123 and 345 of the mesh are the layout vertices contained in the quantum operation control layout 300. Each of the five layout vertices corresponds to one of the five hyperedges $\{1,2,4,5\},\{4,5\},\{1,2\},\{1,2,3\},\{3,4,5\}$ of the hypergraph of FIG. 3. The layout vertex on the bottom left is exemplarily shown with reference sign 312, and the layout vertex on the bottom right is exemplarily shown with reference sign 322.

In FIG. 4, the labels of the layout vertices, i.e., 12, 45, 123, 345, and 1245, provide information about the mesh mapping, i.e., about the hyperedges mapped onto the layout vertices. But the labeling could be arbitrary. If information about the mesh mapping is lacking in the data indicating the layout vertices of the mesh, more specifically if there is no information in the quantum operation control layout allowing to identify which hyperedges of the hypergraph were mapped to which layout vertices, the quantum operation control layout is called intransparent. The quantum computation can still be carried out, controlled by the quantum operation control layout. But, without the connection to the hypergraph, it is not apparent to the person carrying out the quantum computation to which problem a solution is actually sought. When passing back the results of the quantum computation to a second person knowing the relation to the hypergraph, the second person can compute the ground state energy of the associated spin model, or can compute a solution to a computation problem encoded in the hypergraph if the second person knows which computational problem was mapped to the hypergraph. If the quantum operation control layout contains information allowing to identify which hyperedges of the hypergraph were mapped to which layout vertices, e.g., by providing information about the mesh mapping, the quantum operation control layout is called transparent.

The quantum operation control layout can include the weights of the hyperedges, wherein the weight of each hyperedge is associated with the layout vertex onto which the corresponding hyperedge is mapped. For instance, a weighted hyperedge could be represented as a pair ({1,2}, $J_{12}$), wherein the first element of the pair stands for the hyperedge and the second element of the pair stands for the weight. This weighted hyperedge can be mapped to the pair (12, $J_{12}$), containing the layout vertex 12 and the weight $J_{12}$. For a weighted hypergraph, the edge set may contain such pairs as elements.

In addition, the quantum operation control layout includes data indicating layout vertex sets. Each layout vertex set consists of layout vertices within a cell of the mesh. The layout vertices of a layout vertex set correspond to the hyperedges of a regular generalized cycle of the constraining subset of regular generalized cycles. In an intransparent quantum operation control layout, this correspondence is not apparent. Providing this correspondence can make the quantum operation control layout transparent if information about the mesh mapping can be derived therefrom. The mesh mapping that maps the hyperedges to the layout vertices of the mesh may be viewed to simultaneously map the regular generalized cycles of the constraining subset to the layout vertex sets. The layout vertices and layout vertex sets form a second hypergraph whose nodes are the layout vertices and whose layout vertex sets are the hyperedges. Since the layout vertices are part of the mesh, specifically of the cells that indicate which quantum interactions are possible and that have a neighborhood relation, layout vertices provide additional information associated with physical properties of the quantum system that the second hypergraph does not by itself convey.

In FIG. 4, two layout vertex sets 310 and 320 are contained in the quantum operation control layout 300, namely the layout vertex sets indicated by the triangle and the square between the corresponding layout vertices, i.e. the sets {1245, 45, 12} and {45, 12, 123, 345} of layout vertices. This information is completed in the example of FIG. 4 by the information about the mesh, which is quadrangular in this example. FIG. 4 is graphical representation of the quantum operation control layout. The quantum operation control layout can be provided by appropriate data structures in machine-readable form. The quantum operation control layout can be stored in memory, displayed on a display device and/or sent over a network, e.g., and may serve as input to a controller of a quantum computation for controlling the quantum computation.

Quantum Computation

In further embodiments, a method of performing a quantum computation on a quantum system is provided. The quantum computation is carried out on constituents of the quantum system, in particular on physical qubits. A quantum operation control layout as described herein, e.g., a quantum operation control layout obtained by the methods of determining a quantum operation control layout for a quantum computation described herein, may be provided. The quantum operation control layout may be loaded, for instance, into a controller of the quantum computation. The constituents of the quantum system are spatially arranged such that there is a constituent for every layout vertex of the mesh and quantum interactions are possible between constituents corresponding to layout vertices within each layout vertex set.

The quantum computation may be controlled by the quantum operation control layout. The quantum system may be prepared in an initial state, such as the ground state of an initial Hamiltonian $H_0$. For each layout vertex associated with a non-zero weight, a local field with a strength corresponding to the non-zero weight is applied to the constituent corresponding to that layout vertex. For each layout vertex set, quantum interactions between constituents corresponding to the layout vertices of that layout vertex set are performed. A cardinality c of a layout vertex set implies a c-body interaction between the constituents corresponding to the layout vertices of that layout vertex set. The strengths of the quantum interactions between two or more constituents (2-body interactions or higher) may be larger than any strength of a local field (1-body interaction), with the possible exception of local fields that shall impose constraints (see, e.g., the special elements mechanism described later). The state of the quantum system may be evolved during the quantum computation to a final state. The final state may be the ground state or a thermal state close to the ground state of a final Hamiltonian $H_f$, or may be a state such that the ground state of the final Hamiltonian $H_f$ and that state have a high fidelity.

Let M be the mesh, L(M) the quantum operation control layout, $V_M$ the set of layout vertices of the quantum operation control layout, and VS the set of layout vertex sets of the quantum operation control layout. The initial Hamiltonian may be $$H_0 = \sum_{v \in V_M} A_v \sigma_x^{(v)},$$

wherein the Pauli operator $$\sigma_x^{(v)}$$

acts on a physical qubit arranged in accordance with the layout vertex v of the mesh M, and $A_v$ are coefficients, which may be dependent on time ($A_v = A_v(t)$), and which may be independent of v ($A_v = A$ or $A_v(t) = A(t)$).

The final Hamiltonian $H_f$ may be the sum of a problem Hamiltonian $H_P$ and short-range Hamiltonian $H_S$. The problem Hamiltonian may be $$H_P = \sum_{v \in V_M} P_v \sigma_z^{(v)}$$

wherein the Pauli operator $$\sigma_z^{(v)}$$

acts on a physical qubit arranged in accordance with the layout vertex v of the mesh M, and $P_v$ are coefficients, which may be dependent on time ($P_v=P_v(t)$), wherein the time-dependent part may be independent of v, i.e., $P_v=P(t)W_v$ for all v. Therein, $W_v$ is the weight associated with layout vertex v, and is the same weight associated with the hyperedge of the hypergraph mapped to the layout vertex v of mesh M by the mesh mapping. The short-range Hamiltonian $H_S$ may be a sum of constraint Hamiltonians, where each constraint Hamiltonian acts on the constituents of the quantum system associated with the layout vertices of a layout vertex set. The short-range Hamiltonian may have the form $$H_S = \sum_{vs \in VS} S_{vs} \otimes_{v \in vs} \sigma_z^{(v)}, \text{ where } \otimes_{v \in vs} \sigma_z^{(v)} = \sigma_z^{(v_1)} \dots \sigma_z^{(v_{|vs|})}$$

with vs having the form $vs=\{v_1, \dots, v_{|vs|}\}$ for all $vs \in VS$, and $|vs|$ is the cardinality of the layout vertex set vs. Further, $S_{vs}$ are coefficients, which may be dependent on time ($S_{vs}=S_{vs}(t)$), wherein the time-dependent part may be independent of vs, i.e., $S_{vs}=C(t)C_{vs}$ for all $v \in vs$. Also, the absolute value of $C_{vs}$ may be independent of vs, so either $C_{vs}=C_0$ or $C_{vs}=-C_0$.

The evolution of the quantum system during the quantum computation may be done by an adiabatic sweep (quantum annealing) in the way described in EP 3 113 084 A1, by counter-diabatic driving using a Hamiltonian with an additional counter-diabatic part in the way described in PCT/EP2019/066916, or by gate-based, vastly parallelizable quantum computation in the way described in PCT/EP2019/052528. The documents EP 3 113 084 A1, PCT/EP2019/066916, and PCT/EP2019/052528 are incorporated by reference.

The method can include measuring some or all of the constituents of the quantum system. The measurement of at least a portion of the constituents of the quantum system provides a readout of the final state of the quantum system. The readout can contain information about the ground state energy of the spin model, and ultimately about the computational problem encoded in the hypergraph that is associated with the spin model. For computational problems in the class NP, any trial solution thus generated can be checked in polynomial time by classical computation to determine if it is a solution to the computational problem. If not, the quantum computation may be repeated until a trial solution turns out to be a solution, or may be repeated a finite number of times after which the best trial solution is chosen as an approximate solution.

The information about the spin model can be contained in a redundant manner in the quantum system. It can be sufficient to measure a readout group of constituents, wherein the constituents are chosen such that the layout vertices of the mesh to which they correspond are associated via the mesh mapping with hyperedges of the hypergraph that can be used to create a path with distinct endpoints over all nodes of the hypergraph. A path has no repeating nodes and no repeating hyperedges. A variety of such readout groups can be available. For instance, in FIG. 4, the constituents associated with the layout vertices 12, 123, 345, 45 form a first readout group since the corresponding hyperedges create the path $1 \xrightarrow{\{1,2\}} 2 \xrightarrow{\{1,2,3\}} 3 \xrightarrow{\{3,4,5\}} 4 \xrightarrow{\{4,5\}} 5$ with distinct endpoints over all nodes 1, . . . , 5. A second readout group is formed by the constituents associated with the layout vertices 12, 1245, 45, 123 since the corresponding hyperedges create the path $4 \xrightarrow{\{4,5\}} 5 \xrightarrow{\{1,2,4,5\}} 1 \xrightarrow{\{1,2\}} 2 \xrightarrow{\{1,2,3\}} 3$ with distinct endpoints over all nodes 1, . . . , 5.

If the quantum operation control layout is transparent, one readout group of constituents may be measured. Alternatively, more than one readout group of constituents or just all of the constituents may be measured, the latter implying measuring all readout groups. The additional information may be used, e.g., for consistency checks or classical error correction. For an intransparent quantum operation control layout, all constituents can be measured and the result returned, allowing ignorance about which constituents form readout groups.

Regular Generalized Cycles with Special Elements and Auxiliary Constituents

Consider the regular generalized cycle {{1,2,4,5},{4,5}, {1,2}} of the example of FIG. 3, which maps under the mesh mapping to a layout vertex set {1245, 45, 12} that is shown in FIG. 4 as a triangle with reference sign 310. This layout vertex set leads to a three-body interaction between the corresponding constituents of the quantum system in the quantum computation. At the same time, the regular generalized cycle {{4,5},{1,2},{1,2,3},{3,4,5}} leads to a layout vertex set {45, 12, 123, 345}, shown in FIG. 4 as a square with reference sign 320. The layout vertex set 320 indicates a four-body interaction between the corresponding constituents of the quantum system in the quantum computation.

But there can be quantum systems in which it is difficult or impossible to directly perform both kinds of k-body interactions, in particular not directly the three-body interaction. For instance, with constituents arranged in a square lattice, it may be practicable to have local fields and an interaction between all four constituents of a square, but not directly between any three out of the four constituents. A three-body interaction can then be realized by placing an auxiliary constituent, in particular an auxiliary physical qubit, on the otherwise empty corner of the square of the square lattice, by fixing the state of the auxiliary constituent through a local field, and performing a four body-interaction between the three constituents and the auxiliary constituent. The local field may be set stronger than the interaction strength of the four-body interaction to constrain the auxiliary constituent to remain in the fixed state. The effective interaction is then that of a three-body interaction between the three constituents on the other three corners of the square of the square lattice. This mechanism may be specifically useful for some analog forms of quantum computation. In digital, gate-based forms of quantum computation interactions between an arbitrary subset of constituents of a cell can typically be implemented by one or more gates and/or local operations, and auxiliary physical qubits to effectively realize interactions involving less than all constituents of the cell are then typically not implemented.

The method of determining the quantum operation control layout for the quantum computation can take such physical properties of the quantum system into account as well. A regular generalized cycle can contain one or more special elements, denoted XX. Special elements XX are considered like hyperedges herein. For instance, the regular generalized cycle $\{\{1,2,4,5\},\{4,5\},\{1,2\}\}$ of length three of the example of FIG. 3 can be augmented by the special element XX to form the regular generalized cycle $\{\{1,2,4,5\},\{4,5\},\{1,2\},$ XX$\}$ of length four. Any regular generalized cycle can be augmented by one or more occurrences of the special element XX, and its length be increased by the number of occurrences of the special element XX. Formally, regular generalized cycles may then be considered as multisets, but only the special element XX may occur repeatedly. Therein, the special element XX is considered not to interfere with the property that any node appearing in a hyperedge shall appear an even number of times within all hyperedges of the regular generalized cycle combined (RGC property). Alternatively, the special element XX could be considered to fulfill the RGC property itself. The special element XX could be viewed as a loop $\{X,X\}$ added to the hypergraph on some node X (this is why the notation XX is chosen). Then, hyperedges of this altered hypergraph would be considered as multisets, and the hypergraph may not be simple since many occurrences of the loop $\{X,X\}$ may be needed. But mathematical considerations are not necessary in connection with the special element XX since no ambiguity arises as to how it is handled by the method.

A regular generalized cycle including one or more occurrences of the special element XX may have a length equal to the maximal vertex number of the cells of the mesh, or at least equal to the vertex number of some cell of the mesh. Every occurrence of the special element XX in a regular generalized cycle means that a corresponding number of special layout vertices xx is created in the quantum operation control layout, and all layout vertices and special layout vertices corresponding to the elements in the regular generalized cycle belong to the same cell of the mesh. For instance, the regular generalized cycle $\{\{1,2,4,5\},\{4,5\},\{1,2\}, XX\}$ is mapped to a layout vertex set $\{1245, 45, 12, xx\}$ shown in FIG. 5 with a square with reference sign 390. Since special element XX is treated as a hyperedge herein, the mesh mapping maps it to a layout vertex xx, shown with reference sign 392. When constructing the mesh mapping by arranging the images of hyperedges of regular generalized cycles on vertices of cells of the mesh, every special element XX or corresponding special layout vertex xx matches any other. This is justified since, during the quantum computation, all constituents in a fixed quantum state corresponding to special layout vertices xx are fixed to the same quantum state, e.g., by large local fields. Special layout vertices are identifiable even in an intransparent quantum operation control layout, e.g., by a special labeling or by very large weights.

Using constituents of the quantum system that remain in a fixed state during the quantum computation, and thus using special elements XX and special layout vertices xx in the method, can allow some k-body interaction to be indirectly implemented when only some k+l-body interaction is practicable in a specific quantum system. If the k-body interaction can be directly implemented, it may not be preferred to use the special elements mechanism. This is because additional constituents, such as physical qubits, are needed and occupy a space where otherwise constituents normally participating in the quantum computation could be placed. Moreover, putting the additional constituents in the fixed state may require large local fields that may negatively affect the quantum computation (separation of energy scales between normal local fields, strengths of constraint Hamiltonians, and even larger local fields for fixing a quantum state). The physical capabilities of the quantum system as to which interactions can be directly implemented may be explicitly considered in the method of determining the quantum operation control layout for the quantum computation, e.g. in the form of data that is provided. Based on this information, a choice may be made whether to include regular generalized cycles with special element(s) in the determination of regular generalized cycles, or not. Alternatively, regular generalized cycles may always be allowed to include special elements, or always be disallowed to include special elements, and so the method may be designed to meet physical capabilities of a particular quantum system implicitly.

Enlarged Hypergraphs and Ancilla Constituents

Some hypergraphs may not possess a sufficient number of regular generalized cycles of a length smaller than or equal to the maximal vertex number of the cells of the mesh. For instance, consider the hypergraph $\{\{1,2\},\{2,3\},\{3,4\},\{4,5\},$ $\{5,6\},\{1,6\}\}$ shown in FIG. 6 with reference sign 201. The hypergraph 201 is associated with a spin model having pairwise interactions in the Hamiltonian. If the six spins are arranged on a ring so that spins 1 and 6 become nearest neighbors, then all pairwise interactions would be nearest-neighbor interactions in this example.

If the mesh is hexagonal, such as the mesh 101 in FIG. 7, each cell contains six vertices, and the maximal vertex number of the cells of the mesh is six. There is one regular generalized cycle of length six, namely the set of hyperedges $\{\{1,2\},\{2,3\},\{3,4\},\{4,5\},\{5,6\},\{1,6\}\}$. The weights associated with the hyperedges are omitted here. Since there are N=6 nodes and K=6 hyperedges and all hyperedges have even cardinality (namely two), K–N+1=1 constraint is needed, and one constraint is imposed by this regular generalized cycle, which forms a constraining subset. The hypergraph has only this one regular generalized cycle, so here the constraining subset is equal to the set of all regular generalized cycles of the hypergraph 201. The quantum operation control layout 301 with layout vertices 12, 23, 34, 45, 56 and 16 and with layout vertex set $\{12, 23, 34, 45, 56, 16\}$ is shown in FIG. 7. Therein, the layout vertex on the bottom is exemplarily marked with reference sign 332, and the layout vertex set with reference sign 330.

If the mesh is quadrangular, each cell contains four vertices, and the maximal vertex number of the cells of the mesh is four. The hypergraph does not contain any regular generalized cycle of length smaller than or equal to four. Still, one constraint imposed by a regular generalized cycle would be needed to provide consistency between the spin model associated with the hypergraph and the quantum system whose physical properties (interaction capabilities) are reflected by the mesh.

To generate the quantum operation control layout for the quadrangular mesh of this example, the hypergraph may be enlarged by adding additional hyperedges between the nodes of the hypergraph, wherein the additional hyperedges are associated with zero weights. The hypergraph is transformed into an enlarged hypergraph, wherein the order of the hypergraph stays the same, but the size becomes larger. Regular generalized cycles of the required length at most four, i.e., not greater than the maximal vertex number of the cells of the mesh, are determined in the enlarged hypergraph.

Under the mesh mapping, an additional hyperedge is treated like any other hyperedge and mapped to a layout vertex. A layout vertex to which an additional hyperedge is mapped is associated with zero weight. In the quantum computation, a constituent of the quantum system corresponding to such a layout vertex is called an ancilla constituent, in particular an ancilla qubit, and no local field acts on it, or formulated differently, a local field with strength zero corresponding to the zero weight. A constraint Hamiltonian acts on the constituents corresponding to layout vertices of a layout vertex set no matter if these layout vertices, by the mesh mapping, stem from additional hyperedges of the enlarged hypergraph which are not contained in the hypergraph, or stem from hyperedges of the hypergraph.

Adding an additional hyperedge increases the size K of the hypergraph to a size K+1 of the enlarged hypergraph. If the hypergraph did not have sufficiently many regular generalized cycles of the required length to impose constraints, then, if one additional hyperedge is added and thereby one regular generalized cycle of the required length is generated that imposes one constraint, there is no gain towards providing consistency between the spin model and the quantum system. This is because the enlarged hypergraph of size K+1 requires one more regular generalized cycle than the hypergraph of size K, so there is still an insufficient number of regular generalized cycles of the required length. If c additional hyperedges are added to provide an enlarged hypergraph with at least c+1 additional regular generalized cycles of the required length, then progress towards providing consistency between the spin model and the quantum system can be made.

For instance, the hypergraph of FIG. 6 may be enlarged by two additional hyperedges {1,4} and {3,6}, shown with reference signs 247 and 245, respectively, to form the enlarged hypergraph {{1,2},{2,3},{3,4},{4,5},{5,6},{1,6}, {1,4},{3,6}} shown in FIG. 8 with reference sign 202. The following three regular generalized cycles of length not greater than four that form a constraining subset can be determined: {{1,2},{2,3},{3,4},{1,4}}, {{3,4},{4,5},{5,6}, {3,6}}, and {{1,4},{3,4},{3,6},{1,6}}. Now, (K+2)−N+1= (6+2)−6+1=3 regular generalized cycles and a corresponding number of imposed constraints are required S and are delivered. The quantum operation control layout 302 has layout vertices {12, 23, 34, 45, 56, 16, 14, 16}, of which the layout vertex with label 45 corresponding to the hyperedge 232 is exemplarily shown with reference sign 332. The quantum operation control layout contains vertex sets {12, 23, 34, 14}, {34, 45, 56, 36} and {14, 34, 36,16}, shown in FIG. 9 as squares. The layout vertices 14 and 36 corresponding to the added hyperedges 247 and 245 are shown with reference signs 347 and 345. When the quantum operation control layout drives a quantum computation on a quantum system, the ancilla constituents of the quantum system corresponding to the layout vertices 14 and 36 are not acted upon by a local field. Comparing FIGS. 7 and 9, the quantum operation control layouts 301 and 302 in these two figures are different, but they are derived from the same hypergraph, just for different meshes, namely a hexagonal mesh 101 shown in FIG. 7, and a quadrangular mesh 100 that is, e.g., shown in FIG. 1. Since the forms of the meshes reflect physical properties of the quantum systems, the examples show once more that the method is considerate of the physical properties of the quantum system reflected by the form of the mesh, and the output thus depends thereon.

Figure 11:
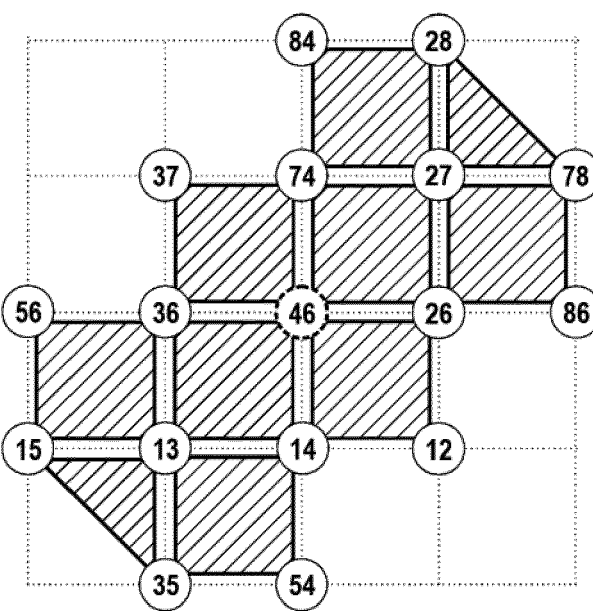

Moreover, enlarging the hypergraph by one or more additional hyperedges to form an enlarged hypergraph can help to form a mesh mapping consistent with the requirement that, for all layout vertex sets corresponding to regular generalized cycles, the layout vertices of each layout vertex set are contained in one cell of the mesh. For instance, FIG. 10 shows a 2-uniform hypergraph, and FIG. 11 shows a quantum operation control layout containing a layout vertex 46. The layout vertex 46 is a vertex of the mesh onto which the mesh mapping has mapped an additional hyperedge {4,6} of an enlarged hypergraph. There are 17 layout vertices corresponding to 17 hyperedges of the enlarged hypergraph, and there are 8 nodes in the hypergraph and the enlarged hypergraph. The layout vertex sets of the quantum operation control layout provide ten constraints, where K−N+1=17−8+1=10 are sufficient.

Side Conditions and Irregular Generalized Cycles

Figure 12:
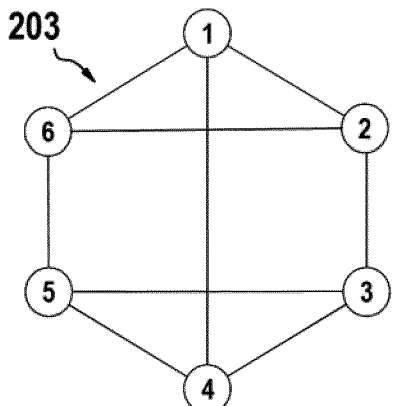
Figure 13:
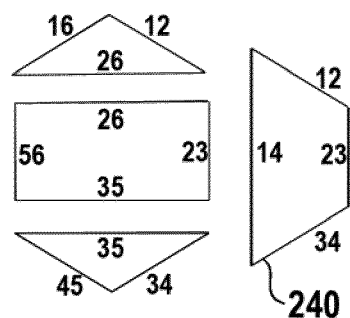
FIG. 13 shows regular generalized cycles of a hypergraph, which may be used in embodiments described herein.
Figure 14:
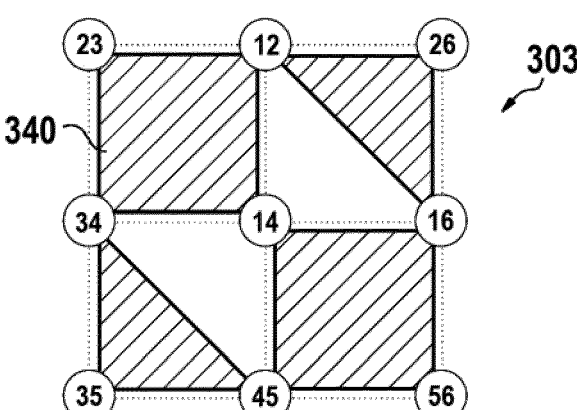

In a further example, a 2-uniform hypergraph 203 as shown in FIG. 12 is provided, and the mesh considered in the method is a quadrangular mesh. The hypergraph shown in FIG. 12 has five regular generalized cycles of length smaller than or equal to four, where four is the maximal vertex number of the cells of the quadrangular mesh. The five regular generalized cycles of length at most four are {{1,2},{2,6},{1,6}}, {{3,4},{4,5},{3,5}}, {{1,4},{4,5},{5, 6},{1,6}}, {{1,4},{3,4},{2,3},{1,2}} and {{2,3},{3,5},{5, 6},{2,6}}, and are shown in FIG. 13. The rightmost regular generalized cycle shown in FIG. 13 is exemplarily given reference sign 240. Four of these five regular generalized cycles are sufficient to form a constraining subset since K−N+1=9−6+1=4. FIG. 14 shows a quantum operation control layout with layout vertices {12, 23, 34, 45, 56, 16, 26, 35, 14} corresponding to the hyperedges under the mesh mapping, and with layout vertex sets {23, 12, 14, 34} and {13, 16, 56, 45} indicated as squares and with layout vertex sets {34, 45, 35} and {12, 26, 16} indicated as triangles, wherein the layout vertex sets correspond to a constraining subset of four of the five regular generalized cycles. The layout vertex set 340 corresponds to the regular generalized cycle 240 of FIG. 13.

Figure 15:
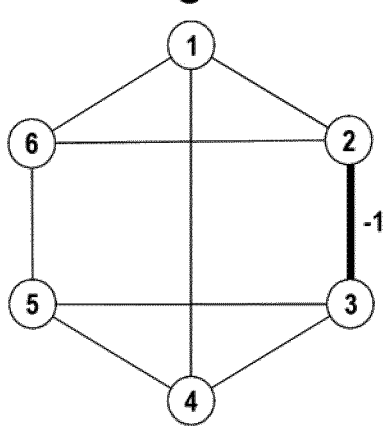
FIG. 15 shows a hypergraph with side conditions, which may be used in embodiments described herein.

The spin model associated with a hypergraph can come with one or more side conditions. For instances, the spin model Hamiltonian $$H(\sigma_z^{(1)}, \dots, \sigma_z^{(N)}) = \sum_i^N h_i \sigma_z^{(i)} + \sum_{i<j}^N J_{ij} \sigma_z^{(i)} \sigma_z^{(j)} +$$
$$\sum_{i<j<k}^N R_{ijk} \sigma_z^{(i)} \sigma_z^{(j)} \sigma_z^{(k)} + \sum_{i<j<k<l}^N T_{ijkl} \sigma_z^{(i)} \sigma_z^{(j)} \sigma_z^{(k)} \sigma_z^{(l)} + \cdots$$

may be subject to side conditions of the form $$\sigma_z^{(i)} = 1 \text{ or } -1, \sigma_z^{(i)} \sigma_z^{(j)} = 1 \text{ or } -1,$$
$$\sigma_z^{(i)} \sigma_z^{(j)} \sigma_z^{(k)} = 1 \text{ or } -1, \sigma_z^{(i)} \sigma_z^{(j)} \sigma_z^{(k)} \sigma_z^{(l)} = 1 \text{ or } -1$$

etc. for some i, j, k, l. In the hypergraph, the corresponding hyperedge may be marked accordingly. For instance, when the side condition $$\sigma_z^{(2)} \sigma_z^{(3)} = -1$$

is imposed on the spin model associated with the hypergraph of FIG. 12, the resulting hypergraph with side condition may be represented as shown in FIG. 15.

In the quantum system on which the quantum computation is to be performed, each constituent corresponds to a layout vertex of the mesh which, in turn, corresponds to a hyperedge of the hypergraph. A hyperedge with side condition (+1 or −1) means that the corresponding constituent of the quantum system need not participate in the quantum computation and can be removed with its effects being absorbed. The first effect of the side condition $$\sigma_z^{(a)}\sigma_z^{(b)}\sigma_z^{(c)} \ldots = \pm 1$$

is an energy contribution of +1 or −1 times the weight of the hyperedge to the ground state energy of the final Hamiltonian. This is because $$\sigma_z^{(a)}\sigma_z^{(b)}\sigma_z^{(c)}$$

corresponds to the local operator $$\sigma_z^{(abc \ldots)}$$

in the problem Hamiltonian, and due to the side condition, $$W_{abc\ldots} \; \sigma_z^{(abc \ldots)} = \pm W_{abc\ldots}.$$

This offsets the ground state energy by a constant energy. In conventional approaches a large, i.e., in a practical sense infinite, weight/energy would used to enforce the constraint. For the quantum computation described herein, the energy offset is irrelevant and can be ignored.

The second effect concerns any regular generalized cycle in which one or more hyperedges having a side condition are contained. For instance, in the hypergraph with side condition of FIG. 15, the regular generalized cycle {{2,3},{1,2}, {1,4},{3,4}} would ultimately be associated with a constraint Hamiltonian $$H_{\{23,12,14,34\}}^{C} = C\sigma_z^{(23)}\sigma_z^{(12)}\sigma_z^{(14)}\sigma_z^{(34)}$$

as a summand term in the final Hamiltonian $H_f$. But $$\sigma_z^{(2)}\sigma_z^{(3)} = -1, \text{ and so } \sigma_z^{(23)} = -1,$$

and therefore $$H_{\{23,12,14,34\}}^{C} = -C\sigma_z^{(12)}\sigma_z^{(14)}\sigma_z^{(34)} = H_{\{12,14,34\}}^{-C}.$$

That means, no constituent is needed to represent the hyperedge {2,3} with side condition in the quantum computation. Instead, a constraint Hamiltonian on the constituents arranged on the layout vertices 12, 14, 34 with interaction strength −C absorbs the effects of the side condition $$\sigma_z^{(2)}\sigma_z^{(3)} = -1.$$

22

Similarly, the constraint Hamiltonian $$H_{\{12,14,34\}}^{+C} = +C\sigma_z^{(12)}\sigma_z^{(14)}\sigma_z^{(34)}$$

with interaction strength +C would have absorbed the side condition $$\sigma_z^{(2)}\sigma_z^{(3)} = +1.$$

Accordingly, the regular generalized cycle {{2,3},{1,2}, {1,4},{3,4}} of length four can be reduced to the irregular generalized cycle {{1,2},{1,4},{3,4}} of length three associated with the pair ({{2,3}},−1). The first element of the pair is a set that contains hyperedges with side conditions completing the irregular generalized cycle to a regular generalized cycle. In the example this is the hyperedge {2,3} with side condition "−1". Every node appearing in one hyperedge of the irregular generalized cycle and appearing an odd number of times in all of the hyperedges of the irregular generalized cycle are balanced by the suppressed hyperedges with constraints. The second element of the pair is the product of the side conditions of the hyperedges of the set that forms the first element of the pair. So, the second element is +1 or −1, and in the example it is −1. In general, an irregular generalized cycle of length r is the set $\{h_1, \ldots, h_r\}$ associated with the pair $$\left(\{h_{c_1}, \ldots, h_{c_s}\}, \prod_{i=1}^{s} c_i\right),$$

wherein $\{h_1, \ldots, h_r\} \cup \{h_{c_1}, \ldots, h_{c_s}\}$ is a regular generalized cycle of length r+s, and $c_1, \ldots, c_s$ are the side conditions of the hyperedges $\{h_{c_1}, \ldots, h_{c_s}\}$. This is the irregular generalized cycle property (IGC property).

Under the mesh mapping, only hyperedges not subject to a side condition are mapped to layout vertices. A layout vertex set of layout vertices that correspond to the hyperedges without side conditions of an irregular generalized cycle is associated with a value of +1 or a value of −1, depending on the value of $$\prod_{i=1}^{s} c_i,$$

even in an intransparent quantum operation control layout. One of the values +1 or −1 may be omitted, and by convention the absence of an explicit value shall implicitly mean a value of +1. The set $\{h_{c_1}, \ldots, h_{c_s}\}$ can be indicated to provide the connection with the hypergraph.

Figure 16:
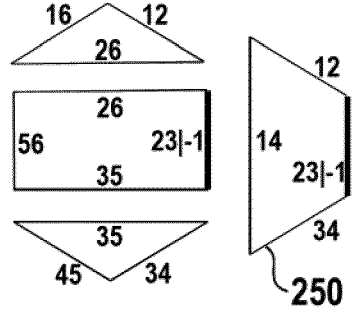
FIGS. 16 and 18 show irregular generalized cycles of a hypergraph with side conditions, which may be used in embodiments described herein.
Figure 17:
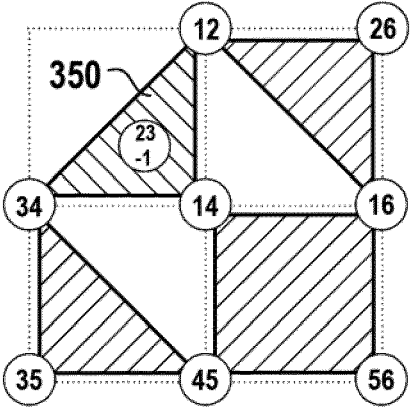

For instance, continuing the example of the hypergraph of FIG. 15, the irregular generalized cycle {{1,2},{1,4},{3,4}} is shown in FIG. 16 with reference sign 250. A corresponding quantum operation control layout is shown in FIG. 17, containing the corresponding layout vertex set 350. In FIG. 17, "23|−1" is used as a shorthand notation for the pair ({{2,3}},−1) associated with the irregular generalized cycle. In the quantum computation, the constraints imposed by the layout vertex sets are enforced by constraint Hamiltonians acting with strength C for the layout vertex sets indicated by the top right triangle, bottom right square and bottom left triangle, and with a strength −C for the top left triangle.

An irregular generalized cycle is of length r even if the regular generalized cycle to which it is completed by s hyperedges with side conditions is of length r+s. If a set of generalized cycles is determined in the method, the generalized cycles can be regular generalized cycles and/or irregular generalized cycles. Determining generalized cycles of a length not greater than the maximal vertex number $v_{max}$ of the cells of the mesh can include determining irregular generalized cycles of length $v_{max}$+s that include s hyperedges with side conditions.

Figure 18:
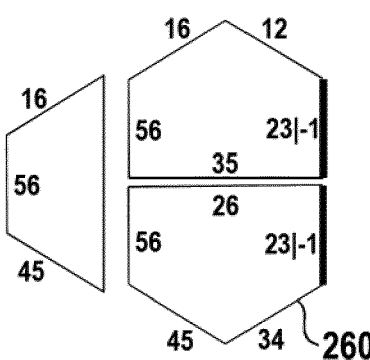
Figure 19:
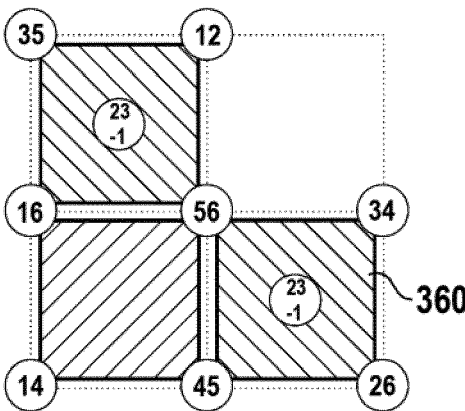

In the example of the hypergraph of FIG. 14, there are two regular generalized cycles of length five which contain the one hyperedge {2,3} having the constraint "−1". These two regular generalized cycles are shown in FIG. 18, of which the one shown on the bottom right is exemplarily provided with reference sign 260. So, there are two irregular generalized cycles of length four, which is equal to $v_{max}$=4 for a quadrangular mesh, namely {{3,5},{5,6},{1,6},{1,2}} and {{3,4},{4,5},{5,6},{2,6}}, both of which are associated with the pair ({{2,3}},−1). Since the hyperedge {2,3} with side condition "−1" is not mapped to a layout vertex and not represented by a constituent of the quantum system during the quantum computation, there are K−N+1=8−6+1=3 generalized cycles required to impose three constraints. So, the two irregular generalized cycles together with the regular generalized cycle {{1,4},{4,5},{5,6},{1,6}} of length four form a constraining subset. FIG. 19 shows a quantum operation control layout with the corresponding layout vertices and layout vertex sets. The layout vertex set 360 is the layout vertex set corresponding to the irregular generalized cycle 260 of FIG. 18. In the quantum computation, the constraints imposed by the layout vertex sets are enforced by constraint Hamiltonians acting with strength −C for the layout vertex sets indicated by the top left square and bottom right square, and with a strength C for the bottom left square.

The quantum operation control layouts shown in FIGS. 17 and 19 provide control for different quantum computations, yet the readout of the final states of the quantum system can contain a solution to the same computational problem encoded in the hypergraph shown in FIG. 15. The quantum operation control layout of FIG. 19 may, for instance, be chosen if a three-body interaction between constituents of the quantum system arranged within a cell of the quadrangular mesh is difficult to implement in the particular quantum system on which the quantum computation is performed, but a four-body interaction can be implemented more easily. The method of determining the quantum operation control layout can be considerate of such properties of the quantum system, e.g., by preferring generalized cycles (both regular and irregular) of length $v_{max}$, i.e., of a length equal to the maximal vertex number of the cells of the mesh, and should generalized cycles of smaller length have to be considered, by increasing their lengths up to $v_{max}$ by the special elements mechanism described herein. In the end, all generalized cycles so determined then have length $v_{max}$.

The mechanism using special elements and auxiliary constituents and/or the mechanism using additional hyperedges (enlarged hypergraph) and ancilla constituents, can also be used in connection with irregular generalized cycles. An irregular generalized cycle may include one or more additional hyperedges and/or may include one or more special elements. The method was described hereinabove for regular generalized cycles, but it can be likewise involve irregular generalized cycles. So, whenever both types may be used, the term "generalized cycle", which includes both types, can replace the term "regular generalized cycle" in the above disclosure.

Figures 20, 21:
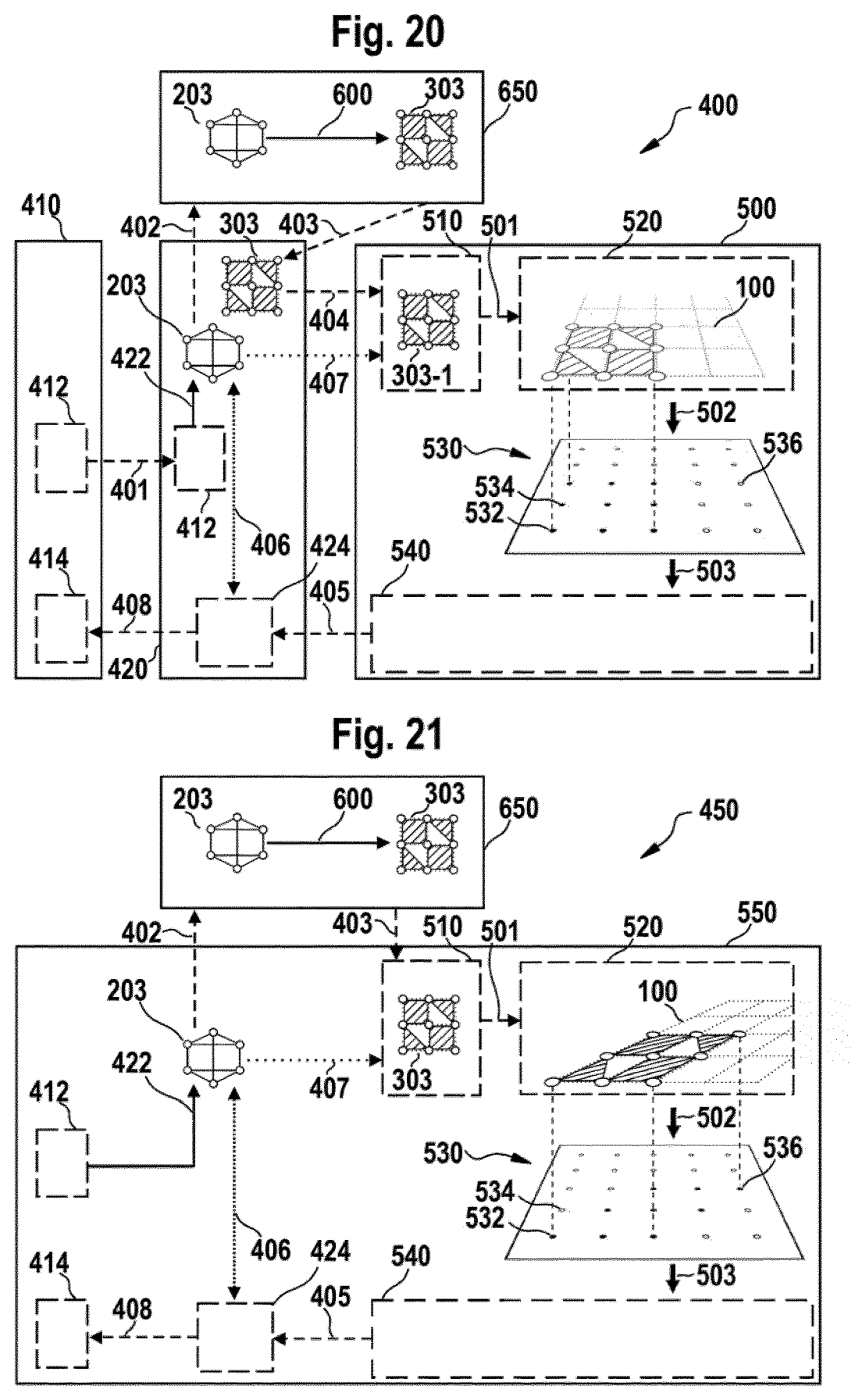

System for the Determination of a Quantum Operation Control Layout and for Quantum Computation Exemplary systems and devices for determining the quantum operation control layout for the quantum computation and/or for performing the quantum computation on a quantum system and/or for solving a (classical) computational problem using the quantum computation are described with respect to FIGS. 20 and 21.

FIG. 20 shows a system 400 for solving a computational problem 412 using a quantum computation performed by a quantum computing system 500. In the embodiment shown in FIG. 20, the computational problem 412 is stored in a first classical computing system 410. A classical computing system may refer to a computing system operating on bits or other classical units of information. A classical computing system may include a central processing unit (CPU) for processing information represented by bits and/or a memory for storing information represented by bits. A classical computing system may include one or more conventional computers, such as personal computers (PCs), and/or a network of conventional computers. The first classical computing system 410 sends, 401, the computational problem 412 to a second classical computing system 420. It shall be understood that sending, receiving, encoding, decoding, storing, loading and other conventional tasks are performed on or with data representing the computational problem, the hypergraphs, the quantum operation control layouts etc., or on or with data from which these entities can be derived. For simplicity, the description omits the mentioning of such data, and speaks about "sending the computational problem", "encoding the hypergraph", "storing the quantum operation control layout" etc.

The second classical computing system 420 encodes, 422, the computational problem 412 into a hypergraph. The hypergraph is associated with a corresponding spin model, so that the solution of finding the ground state energy for the spin model can be transferred back to a solution of the computational problem. In FIG. 20, hypergraph 203 is exemplarily shown as the hypergraph generated by the second classical computing system 420. The second computing system 420 sends, 402, the hypergraph to a system 650 for determining a quantum operation control layout for a quantum computation on a quantum system. The system 650 may be a third classical computing system, such as a conventional computer or a network of conventional computers, a computer cluster or network of computer clusters, or a cloud computing environment. The system 650 may be configured for carrying out the method of determining the quantum operation control layout for the quantum computation described herein. In FIG. 20, the system 650 carries out the computer-implemented method 600, and in the depicted example the system 650 is used to determine the quantum operation control layout 303 from the hypergraph 203.

Figures 22, 23:
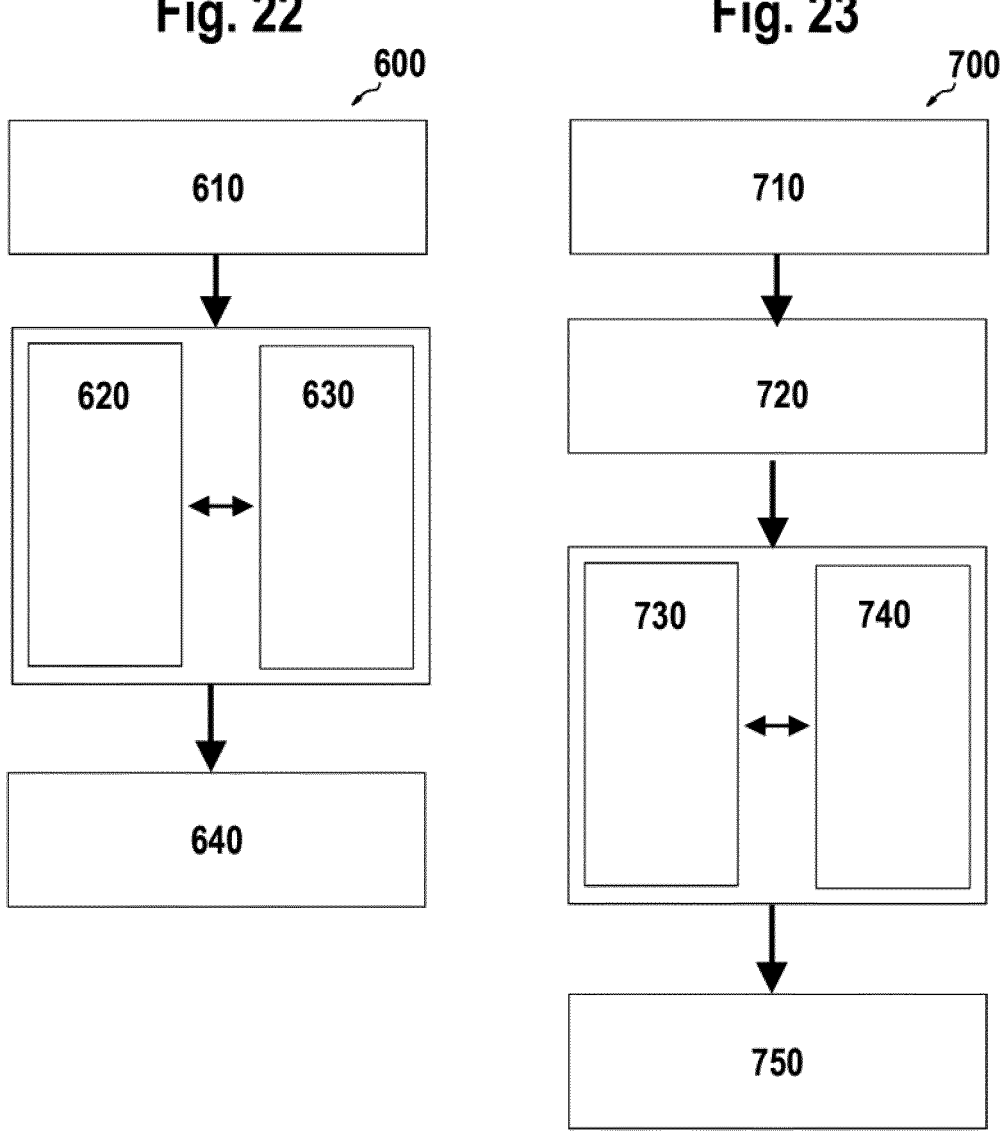
FIG. 22 illustrates a method for determining a quantum operation control layout for a quantum computation according to embodiments described herein.
FIG. 23 illustrates a method for performing a quantum computation according to embodiments described herein.

The computer-implemented method 600 is schematically shown in FIG. 22, and includes providing, 610, hyperedges of a hypergraph, such as hypergraph 203. This may include receiving the hypergraph over a network component and/or loading the hypergraph from memory. The method 600 includes determining, 620, by a processor of the system 650, a set of generalized cycles from the hypergraph or from an enlarged hypergraph, while considering properties of the mesh, in particular the maximal vertex number of the cells of the mesh, as described herein. The method 600 includes determining, 630, by the processor of the system 650, the mesh mapping that maps the hyperedges of the hypergraph (or of the enlarged hypergraph) to the vertices of the mesh so that each generalized cycle of a constraining subset of the set of generalized cycles consists of hyperedges mapped to a cell of the mesh, as described herein. The determination 620 of the generalized cycles may precede the determination 630 of the mesh mapping, but the determination 620 of the generalized cycles and the determination 630 of the mesh mapping may be intertwined, and are thus shown next to each other in FIG. 22. The method 600 includes generating, 640, the quantum operation control layout, such as the quantum operation control layout 303, wherein generating is performed by the processor of the system 650. The quantum operation control layout includes layout vertices of the mesh and layout vertex sets, each layout vertex set consisting of layout vertices within a cell of the mesh that correspond to a generalized cycle of a constraining subset of generalized cycles as determined by the determination 620. As before, "the quantum operation control layout including layout vertices" and the like is to be understood as the quantum operation control layout including data representing the layout vertices etc., but the reference to data and suitable data structures is omitted for simplicity.

The quantum operation control layout determined by the system 650 may be stored in a memory of the system 650. The quantum operation control layout, such as the quantum operation control layout 303 shown in FIG. 20, is sent, 403, to the second classical computing system 420. The second classical computing system 420 sends, 404, the quantum operation control layout in transparent or intransparent form to the quantum computing system 500. In FIG. 20, the quantum computing system is therefore shown to have received quantum operation control layout 303-1 in an input section 510, wherein the quantum operation control layout 303-1 may be the quantum operation control layout 303 or an intransparent form thereof.

The quantum operation control layout 303-1 can control the quantum computation on the quantum computing system 500. A quantum processing unit (QPU) 520 loads, 501, the quantum operation control layout 303-1 from the input section 510, and controls, 502, local operations on the physical qubits of the quantum system 530, as well as interactions between the physical qubits as specified by the quantum operation control layout 303-1. In FIG. 20, the qubits are arranged in a lattice, here a square lattice, and qubits such as qubits 532 and 534 involved in the quantum computation are shown with black dots. Other sites of a lattice are shown with circles, such as site 536, and these other sites may either be empty or occupied by qubits not participating in the quantum computation. When the QPU 520 has evolved the quantum system 530 from an initial state to a final state under the control of the quantum operation control layout 303-1, the qubits of the quantum system 530 or a portion thereof are measured, 503, by a measurement unit 540. Such measurement is also called a readout.

The quantum computing system 500 may perform a method 700 of performing a quantum computation on the quantum system 530 schematically illustrated in FIG. 23. The quantum computation is carried out on the qubits of the quantum system 530. The method 700 includes providing, 710, the quantum operation control layout, which may include loading the quantum operation control layout for executing the control instructions contained therein by the QPU 520. The method 700 includes providing, 720, the qubits of the quantum system in a spatial arrangement, e.g., in a two-dimensional lattice, such that there is a qubit for every layout vertex of the mesh and, for each layout vertex set, quantum interactions are possible between constituents corresponding to layout vertices of that layout vertex set. The provision 720 of qubits in the spatial arrangement may include or consist of addressing proper qubits of a set of qubits fixedly arranged in spatial positions, e.g., in a two-dimensional lattice. The method 700 includes applying, 730, for each layout vertex associated with a non-zero weight, a local field (local operation) to the qubit corresponding to that layout vertex. The method 700 includes, performing, 740, for each layout vertex set, quantum interactions between qubits corresponding to the layout vertices of that layout vertex set. The application 730 of local fields and the performance 740 of quantum interactions may be performed by the QPU 520 in a specific way and order in accordance with the type of driving the quantum system from an initial state to a final state (e.g., adiabatic driving, counter-diabatic driving, gate-based quantum interactions). The method 700 includes measuring, 750, some or all of the constituents of the quantum system, using the measurement unit 540. The results of the measurement 750 are the result of the quantum computation.

The measurement results of the quantum computation are sent, 405, to the second classical computing system 420. The second classical computing system 420 includes a verification unit 424 which receives the measurement results, and checks, 406, if the measurement results contain a solution to the problem of finding the ground state energy of the spin model associated with the hypergraph 203 (spin model problem). If yes, the verification unit 424 computes a solution to the computational problem 412 from the solution to the spin model problem, and sends, 408, the solution to the computational problem 412 to the first classical computing system 410. The first classical computing system receives the solution to the computational problem, the solution to the computational problem being depicted with reference sign 414 in FIG. 20. If the measurement results did not contain a solution to the spin model problem, the second classical computing system 420 instructs, 407, the quantum processing system 500 to repeat the quantum computation. The quantum computation may be repeated until a solution for the spin model problem, and thus ultimately for the computational problem 412, is found, or may be repeated a predetermined finite number of times and the best approximate solution is sent to the first classical computing system if no solution is found in the predetermined finite number of iterations.

In the embodiments shown in FIG. 20, including embodiments of a system 400 for determining the solution to a computational problem, embodiments of a system 650 for determining a quantum operation control layout for a quantum computation on a quantum system, and embodiments of a quantum computing system 500 for performing the quantum computation on the quantum system under the control of the quantum operation control layout, different services may be identified. For instance, from the point of view of the first classical computing system 410, the second classical computing system 420 provides the service of returning a solution 414 to the computational problem 412. The second classical computing system 420 can be viewed to offer an interface that can be queried for a solution to the computational problem 412, wherein the (classical) information flow across the interface is indicated by reference signs 401, 408. From the point of view of the second classical computing system 420, the system 650 provides the service of returning a quantum operation control layout for a quantum computation on a quantum system, given a hypergraph encoding the computational problem and a mesh containing information about the quantum system. Also, the quantum computing system 500 offers a service to the second classical computing system 420, namely the service of returning results (measurement results/readouts) of a quantum computation on the quantum system, given a quantum operation control layout controlling the quantum computation. The second classical computing system 420 may query the quantum computing system 500 to return a description of the mesh, and may pass on that description of the mesh to the system 650 along with a description of the hypergraph, unless a specific mesh is assumed by default by the system 650. The system 650 can be viewed to offer an interface that can be queried for a quantum operation control layout, wherein the (classical) information flow across the interface can include the information indicated by reference signs 402 and 403 (hypergraph and quantum operation control layout), and may also include information about the mesh passed to the system 650. The quantum computing system 500 can be viewed to offer an interface that can be queried for a result of a quantum computation, wherein the (classical) information flow across the interface can include the information indicated by reference signs 404, 405 and 407 (quantum operation control layout, measurement results, repetition command), and may also include information about the mesh passed to the classical computing system 420 by the quantum computing system 500 upon request.

An entity requesting a service need not have knowledge about how that service is performed. For instance, the details about the way the quantum computation is carried out, need not be known to the second classical computing system 420. Conversely, an entity performing a service need not know more information than that passed to its interface. For instance, the quantum computing system 500 need not know the computational problem 412 or even the hypergraph 203, but just the (possibly intransparent) quantum operation control layout 303-1 driving the quantum computation. The services may be remote services offered by the best available infrastructure that may be located in different parts of the world. The first classical computing system 410, the second classical computing system 420, the system 650 for determining the quantum operation control layout for the quantum computation on the quantum system, and the quantum computing system 500 may be separate systems, connected by a network for exchanging classical information between them. The separate systems may be under the control of different parties. Alternatively, any subset of these systems, including the subset consisting of all systems, may be integrated in a common system. Then, information exchange across the interfaces of systems integrated in the common system become internal processes within the common system. The common system may be under the control of one party, while remaining system(s) external to the common system, if any, may be under the control of a different party or of different parties.

FIG. 21 shows a system 450 for solving the computational problem 412 using a quantum computation performed by a quantum computing system 550. The quantum computing system 550 is a common system integrating the functions of the first and second classical computing systems 410, 420 and of the quantum computing system 500 of FIG. 20. The flow of information indicated by reference signs 405 to 408 is now internal within the quantum computing system 550. The QPU 520 is schematically shown to employ a different kind of quantum computation on a quantum system 530 whose qubits may have a different physical nature and addressability as compared to those of FIG. 20. For instance, there is now a qubit at site 536 of the lattice participating in the quantum computation, while site 534 is empty or at least unused. An external service is still requested from the system 650 in the example shown in FIG. 21. System 650 is shown to return the quantum operation control layout 303 determined from the hypergraph 203 directly to the input unit 510.

The methods and systems described herein provide several advantages. For instance, the methods and systems can deal with arbitrary k-body interactions in a spin model with N spins, with k ranging from 1 to N, which corresponds to a hypergraph where the cardinalities of the hyperedges can assume values of k from 1 to N. Many computational problems map with less overhead, in particular with a reduced number of spins and interactions between the spins, to spin models with such k-body interactions as opposed to spin models allowing only two-body interactions or possibly three-body interactions. Since the quantum computation uses constituents such as physical qubits to ultimately represent the k-body interactions/hyperedges, a smaller quantum system with less constituents may be needed to solve a computational problem. Moreover, the quantum operation control layout for controlling the quantum computation may be determined for a two-dimensional mesh, while allowing the spin model to involve k-body interactions, and the hypergraph to involve hyperedges with cardinalities of k, for arbitrarily high k from 1 to N. This means that the quantum computation can be carried out on constituents of the quantum system that are arranged in two spatial dimensions, e.g., in a plane, as opposed to schemes requiring the spatial dimension to be k, which may be infeasible for k larger than two and impossible for k larger than three since our world only has three spatial dimensions. In addition, the number of physical qubits needed for the quantum computation may merely scale with K, i.e., the order of the hypergraph or number of terms in the Hamiltonian of the associated spin model, as this translates to the number of layout vertices under the mesh mapping. As opposed to inflexible schemes scaling on the order of $N^2$ or higher, this can reduce the number of physical qubits needed for the quantum computation considerably. Further, the method and systems are considerate of physical properties of the quantum system, in particular physical properties expressed in the form and possibly size of the mesh (e.g., quadrangular vs. hexagonal mesh), and can therefore optimize quantum operation control layouts for the quantum computation on different quantum systems. Therefore, for a given size of the quantum system on which the quantum computation is to be performed, the methods and systems described herein can allow to compute solutions to larger/more complex classical computational problems. Conversely, for given size/complexity of a classical computational problem, the methods and systems described herein may require a lesser size of the quantum system used for the quantum computation.

It shall be understood that the numbers of nodes, hyperedges, layout vertices, layout vertex sets, and constituents of the quantum system shown in the figures and described herein are used for illustrational and explanatory purposes, and the actual numbers may depart therefrom, and in particular be much larger.

According to further embodiments, a method of determining a quantum operation control layout for a quantum computation on a quantum system is provided. The method may be carried out on a system for determining the quantum operation layout. The system for determining the quantum operation layout may be a classical computing system, and may include a processor and a memory.

The quantum system has constituents. The constituents of the quantum system may be physical qubits, i.e., physical two-level quantum objects. The constituents of the quantum system may be physical qudits, i.e., physical d-level quantum objects, of which only two levels may be used. The constituents may be or include: superconducting qubits, e.g. transmon or flux qubits; trapped ions, e.g. alkaline earth or alkaline earth-like positively charged ions, such as Ca40+; ultracold atoms, e.g. ultracold neutral Alkali atoms, which may be trapped in an optical lattice or large spacing lattices from laser fields; quantum dots, e.g., fabricated from GaAs/AlGaAs heterostructures, where the states of the physical qubit is encoded in spin states; impurities in solid-state crystals, such as NV Centers, which are point defects in diamond crystals, or other impurities such as color centers tied to chromium impurities, rare-earth ions in solid-state crystals, or defect centers in silicon carbide; photonic qubits, wherein the polarization of the photons can form the two quantum levels of the qubit (e.g. vertical polarization representing spin up and horizontal polarization representing spin down). In photonic systems, interactions between photons may be performed via polarizing beam splitters, possibly with additional auxiliary entangled photons and classical post-selection depending on the outcome of measurements of the auxiliary entangled photons.

The quantum system may have Q constituents. The number Q of constituents of the quantum system may be larger than or equal to 9, 16, 25, 50, 100, 1000 or 10000. The number Q of constituents may be smaller than or equal to 20000, 10000, 1000, 500, 200 or 100. The number Q of constituents may be in a range whose lower bound and whose upper bound are given by any of the lower and upper bounds indicated above, as long as a range is thereby formed.

The constituents of the quantum system may be arranged on a two-dimensional surface (manifold). The two-dimensional surface may be planar, or may alternatively include curvature. The constituents may be arranged in a two-dimensional lattice, such as a square lattice, a quadrangular lattice, a triangular lattice or a hexagonal lattice. The constituents of the quantum systems may be arranged in three-dimensional space (on a three-dimensional surface). The constituents may be arranged in a three-dimensional lattice, such as a cubic lattice, a cuboid lattice, or other honeycomb lattice. The surfaces or lattices need not be physical, but may merely describe the spatial positions of the constituents.

The quantum computation is to be carried out on the constituents of the quantum system arranged in accordance with a mesh. A mesh has vertices and cells. A cell contains vertices. A vertex may be an element of different cells. A cell may be represented as a set of vertices, but may have additional structure. A mesh may include, or be, a pair of a vertex set and a cell set, the elements of the vertex set being the vertices of the mesh and the elements of the cell set being the cells of the mesh. The mesh may at least have the structure of a hypergraph. Two cells can be neighboring cells if they have at least one vertex in common. The size of the mesh is the number of cells of the mesh. Vertices of the mesh represent possible sites for the constituents of the quantum system. When the constituents are arranged so that their spatial positions correspond to vertices of the mesh, the quantum system is arranged in accordance with the mesh. Each cell of the mesh indicates that quantum interactions are possible, during the quantum computation, between constituents of the quantum system that are arranged in that cell. Constituents are arranged in a cell when they are arranged so that their spatial positions correspond to vertices of that cell. The mesh need not be physical, but may merely describe properties of the quantum system, such as which constituent can interact with which other constituents during a quantum computation.

The mesh may have additional structure. A cell of the mesh may have a boundary. The boundary of a cell may be a non-empty subset of that cell, i.e., of the set of vertices forming that cell, but may have additional structure, such as the structure of a tuple of sets of tuples. A vertex that is an element of the boundary is said to lie on the boundary of the cell. A vertex of a cell not contained in the boundary of the cell is said to lie in the interior of the cell. The boundary of a cell may be an improper subset of that cell, i.e., there need not be a vertex lying in the interior of that cell. The mesh may not include any vertex lying in the interior of a cell of the mesh. When the cells have boundaries, two cells may be neighboring cells if they have at least one vertex in common that is an element of the boundaries of these two cells.

The mesh may be embeddable in an m-dimensional manifold, wherein m may particularly be two or three, such as two. A two-dimensional manifold may particularly be a plane. An embedding of the mesh is a mapping of the vertices of the mesh onto points of the m-dimensional manifold. A mesh is embeddable if there is at least one such embedding. One limiting factor for such an embedding to exist is that the mesh describes properties of the quantum system, in particular the property that constituents arranged on the vertices of a cell need to be able to interact during the quantum computation. An embedding typically exists in practice since the mesh is a description of a quantum system whose constituents are arranged in a two-dimensional manifold, such as in a plane, or are arranged in three-dimensional space. An embedding may, but need not, be known in the method of determining the quantum operation control layout or by the system carrying out that method. The embedding may only be known to the system for performing the quantum computation, or to a party owning that system. The mesh may be two-dimensional. The cells of the mesh may be two-dimensional, i.e., embeddable in two-dimensional manifolds such as planes. The mesh may be three-dimensional. A mesh that is embeddable is called a spatial mesh. An embedded mesh, i.e. a mesh with a particular embedding into an m-dimensional manifold, is a geometric mesh (scaling of the manifold and thus of the geometric mesh shall be allowed). FIGS. 1 and 2 show a spatial mesh, and show two possible embeddings turning the spatial mesh into two different geometric meshes.

For a two-dimensional mesh, boundaries of cells may be tuples of vertices. The tuple forming the boundary of a cell can indicate that, under any potential embedding of the mesh into a two-dimensional manifold, geodesic segments (such as line segments in a plane) between the images of adjacent elements (vertices) of the tuple, with the first and last element of the tuple being regarded as adjacent, represent an image of the boundary of that cell in the two-dimensional manifold, and enclose an area of the cell. For a three-dimensional mesh, boundaries of cells may be sets of tuples of vertices. The set of tuples forming the boundary of a cell can indicate that, under any potential embedding of the mesh into three-dimensional Euclidean space, line segments between the images of adjacent elements (vertices) of any tuple, with the first and last element of the tuple being regarded as adjacent, represent a face of that cell, and all faces together represent an image of the boundary of the cell in the three-dimensional space, enclosing a volume of the cell. Depending on the properties of the quantum system, an embedding may possess, or be required to possess, some or all of the following properties for some or all of the cells of the mesh: the image of the boundary of a cell, i.e., the geodesic/line segments connecting the images of the vertices of the cell in the manifold, shall not self-intersect; images of vertices of a cell that lie in the interior of the cell (if any) shall lie in the area of the cell in the two-dimensional manifold or in the volume of the cell in the three-dimensional space; the images of boundaries of different cells shall not intersect, i.e., the geodesic/line segments connecting the images of vertices of the different cells shall not intersect in the manifold (but may coincide); the area or volume of a cell defined by the image of the boundary of the cell shall be convex; the images of the boundaries of the cells of the mesh form a covering of the two-dimensional manifold or three-dimensional space (or of finite portions thereof); the images of the boundaries of the cells of the mesh form a tessellation of the two-dimensional manifold or three dimensional space (or of finite portions thereof).

The mesh may be regular, e.g., quadrangular or hexagonal or cuboid. In a regular mesh, each cell contains the same number of vertices. The number of vertices of a cell is called the vertex number of the cell. The vertex number of every cell of the mesh may be the same. The vertex number of every cell of the mesh may be 3, 4, 6 or 8. The maximal vertex number of cells of the mesh is the maximum of the vertex numbers of the cells of the mesh. The maximal vertex number of the cells of the mesh may be 3, 4, 6 or 8. The mesh may be of finite size or of unlimited size. The number of vertices of the mesh may be M. The relation $M \leq Q$ may hold.

The method may include providing information about the quantum system. The information about the quantum system may be explicitly passed as input to the method, or may be implicitly assumed by the method. The information about the quantum system may be any information element or any information elements described herein in connection with the quantum system, including information about the mesh that itself contains information about the quantum system. The method may include providing information about the quantum computation to be performed on the quantum system, e.g., information about the type of quantum computation (analog quantum computation or digital, gate-based quantum computation), sub-type of quantum computation (e.g., adiabatic or counter-diabatic quantum computation as sub-types of an analog quantum computation), or any other information such as the set of gates available for a digital, gate-based quantum computation, and the like.

Specifically, mesh data may be provided, wherein mesh data may represent the mesh or represent at least one information element about the mesh. The mesh data represents the mesh if information about all vertices and cells and their neighborhood relations can be derived from the mesh data. An information element may be one of the following: the dimension of a (spatial) mesh or of its cells, the number of vertices, the number of cells, the number of vertices in the cells, the arrangement of cells of a spatial mesh or geometric mesh, a specific regularity (like quadrangular, hexagonal, . . . ), the maximal vertex number of the cells of the mesh. The method may include assuming default values for information element(s) not represented by the mesh data of the data set, i.e., not derivable from the mesh data. For instance, if only a maximal vertex number of the cells of the mesh with a value of four were represented by the mesh data, the method may assume a two-dimensional, quadrangular mesh of practically unlimited size.

The method may include providing the mesh as input, irrespective of whether the mesh is derived from the mesh data, from the mesh data and at least partly from default values, or solely from default values. Alternatively, a spe-cific form of a mesh may be implicitly assumed in the method, such as a two-dimensional quadrangular or hexagonal mesh of practically unlimited size.

The method includes providing a data set including data representing hyperedges of a hypergraph. The mesh data may be provided as part of the data set or separately. Providing the data set may include receiving the data set over a network from a remote classical computing system and/or loading the data set from the memory. The data set, or at least the data representing the hyperedges, may be provided to the processor. The method may include deriving the hypergraph from the data representing the hyperedges. The data set may include data representing nodes of the hypergraph. The method may include deriving the hypergraph from the data set, respectively from the data representing the hyperedges of the hypergraph.

Data representing hyperedges, nodes, a hypergraph etc. allows the hyperedges, nodes, hypergraph etc. to be derived from the data. The method may include converting at least one of the data set, the data representing the hyperedges, the data representing the nodes, and the hypergraph into a standard data format. Deriving and/or converting may be performed by the processor.

The number of nodes of the hypergraph, i.e., the order of the hypergraph, may be N. The number N of nodes of the hypergraph may be larger than or equal to 5, 10, 20, 40, 50, 100 or 200. The number of hyperedges of the hypergraph, i.e. the size of the hypergraph or cardinality of the hyperedge set, may be K. Hyperedges with side conditions are not counted, their effect being absorbed in irregular generalized cycles. The number K of hyperedges of the hypergraph may be larger than or equal to 9, 16, 25, 50, 100, 1000 or 10000. The number K of hyperedges of the hypergraph may be smaller than or equal to 20000, 10000, 1000, 500, 200 or 100. The number K of hyperedges of the hypergraph may be in a range whose lower bound and whose upper bound are given by any of the lower and upper bounds indicated above, as long as a range is thereby formed.

The cardinality of at least one hyperedge of the hypergraph may be odd. The cardinality of at least one hyperedge of the hypergraph may be one and/or the cardinality of at least one hyperedge of the hypergraph may be at least three. The cardinality of at least one hyperedge of the hypergraph may be at least four. The maximal cardinality of the hyperedges of the hypergraph, i.e. the maximum of the cardinalities of the hyperedges of the hypergraph, also called the rank (rank(H)) of the hypergraph, may be larger than or equal to 2, 3, 4, 5, 6, and may be in the range from 2 to N or in the range from 3 to N. The number K of hyperedges of the hypergraph may be smaller than $$\sum\nolimits_{j=1}^{rank(H)} \binom{N}{j}$$

or smaller than $$\binom{N}{rank(H)}.$$

The number K of hyperedges of the hypergraph may be smaller than $N(N-1)/2$. The relation $K \leq M$ may hold. The relation $K < Q$ or $K = Q$ may hold.

The hyperedges of the hypergraph may be associated with weights. The weights and/or the association of the weights with the hyperedges may be included in the data set, respectively in the data representing the hyperedges of the hypergraph. The hypergraph may be a weighted hypergraph. The weights may be integers, numbers from a finite set of integers, numbers from a finite set of real numbers, or real numbers. The absolute values of the weights may be lower bounded by a constant $w_{min}$. The absolute values of the weights may be upper bounded by a constant $w_{max}$. The hypergraph may be at least one of: simple, non-isolated, connected, k-uniform, i-bound, d-regular. Therein, k may be an integer in the range from 2 to N, and l may be an integer in the range from 2 to N−1. The hypergraph is i-bound if l=rank(H)<N. The hypergraph is d-regular if the degree of every node of the hypergraph is d. The degree of a node is the number of hyperedges containing the node. The hypergraph is non-isolated if it contains no node of degree zero.

A hyperedge of the hypergraph may be associated with a side condition. Several hyperedges of the hypergraph may be associated with respective side conditions. The side condition(s) and/or the association(s) of the side condition(s) with the hyperedge(s) may be included in the data set, respectively in the data representing the hyperedges of the hypergraph. A side condition may be indicated by a sign (plus sign or minus sign) or a factor of +1 or −1.

The method includes determining a set of generalized cycles. Determining the set of generalized cycles may be performed by the processor of the system for determining the quantum operation control layout. Generalized cycles are sets of hyperedges. The cardinality of a generalized cycle is called the length of the generalized cycle. The maximal length of the generalized cycles of the set of generalized cycles is the maximum of the lengths of the generalized cycles of the set of generalized cycles. The generalized cycles can contain hyperedges of the hypergraph or can contain hyperedges of an enlarged hypergraph. That is, the elements of the generalized cycles are the hyperedges of the hypergraph or of the enlarged hypergraph. The set of generalized cycles may include or consist of regular generalized cycles. The set of generalized cycles may include or consist of irregular generalized cycles. The set of generalized cycles may include a regular generalized cycle and an irregular generalized cycle. A generalized cycle may include a special element as described herein. The special element is considered as a hyperedge, and counts for the length of a generalized cycle. A non-zero weight may be assigned to a special element. The absolute value of the non-zero weight of the special element may be larger than the absolute value of any weight associated with a hyperedge of the hypergraph, i.e. larger than $w_{max}$.

The enlarged hypergraph at least includes the hyperedges of the hypergraph and an additional hyperedge. The additional hyperedge may include at least one node of the hypergraph, the nodes of the enlarged hypergraph being the same as the nodes of the hypergraph. The enlarged hypergraph may include two or more additional hyperedges. Additional hyperedges of the enlarged hypergraph, i.e. hyperedges which are not contained in the hypergraph, may be assigned a weight of zero. The number of nodes of the enlarged hypergraph, i.e., the order of the enlarged hypergraph, may be N. The number of hyperedges of the enlarged hypergraph, i.e. the size of the enlarged hypergraph, may be $\tilde{K}$. The relation $\tilde{K}=K+\tilde{k}$ may hold, where $\tilde{k}$ is the number of additional hyperedges and may be 1, 2, 3, . . . . The number of additional hyperedges may be upper bounded, e.g., be smaller than one tenth of K. The relation $\tilde{K}\leq M$ may hold. The relation $\tilde{K}<Q$ or $\tilde{K}=Q$ may hold.

The maximal length of the generalized cycles of the set of generalized cycles is not greater than the maximal vertex number of the cells of the mesh. The method may include deriving the maximal vertex number from the vertex numbers of the cells of the mesh. Alternatively, the maximal vertex number may be implicitly assumed in the method. The lengths of regular generalized cycles of the set of generalized cycles may be in the range from three to the maximal vertex number of the cells of the mesh. The lengths of irregular generalized cycles of the set of generalized cycles may be in the range from two to the maximal vertex number of the cells of the mesh. The lengths of generalized cycles of the set of generalized cycles may be in the range from three to the maximal vertex number of the cells of the mesh. The lengths of the generalized cycles of the set of generalized cycles may be equal to the maximal vertex number of the cells of the mesh.

The method includes determining a mesh mapping that maps the hyperedges of the hypergraph or of the enlarged hypergraph to the vertices of the mesh, or that maps data representing the hyperedges of the hypergraph or of the enlarged hypergraph to the vertices of the mesh. Determining the mesh mapping may be performed by the processor of the system for determining the quantum operation control layout. Hyperedges with a side condition may not be mapped to vertices of the mesh. In the mesh mapping, each generalized cycle of a constraining subset of the set of generalized cycles consists of hyperedges mapped to a cell of the mesh. Hyperedges are mapped to a cell of the mesh if they are mapped to vertices belonging to the cell. The constraining subset may be one of a proper subset and an improper subset of the set of generalized cycles. In determining the mesh mapping, the mesh or at least some information element(s) about the mesh may be explicitly considered as parameters of the mesh mapping. Alternatively, some form of the mesh may be implicitly assumed in the mesh mapping.

The cardinality of the constraining subset may be at least K−N. The cardinality of the constraining subset may be at least $\tilde{K}$−N. The cardinality of the constraining subset may be at least K−N+1, at least or at least $\tilde{K}$−N+1. The cardinality of the constraining subset may be equal to K−N or equal to K−N+1 when hyperedges of an enlarged hypergraph are mapped under the mesh mapping, or may be equal to $\tilde{K}$−N or $\tilde{K}$−N+1 when hyperedges of an enlarged hypergraph are mapped under the mesh mapping. The constraining subset may include at least one of: a regular generalized cycle and an irregular generalized cycle. The constraining subset may include or consist of at least one regular generalized cycle. The constraining subset may include or consist of at least one irregular generalized cycle. The union of generalized cycles of the constraining subset of generalized cycles may contain all hyperedges of the hypergraph or of the enlarged hypergraph.

The mesh mapping may be constructed by mapping the hyperedges of a first generalized cycle of the set of generalized cycles on vertices of a cell of the mesh, by mapping the hyperedges of a second generalized cycle of the set of generalized cycles on the vertices of a neighboring cell of the mesh, wherein the first generalized cycle and the second generalized cycle have at least one hyperedge in common and the at least one hyperedge is mapped on a corresponding at least one vertex of the mesh. This process of mapping hyperedges of generalized cycles of the set of generalized cycles may be repeated until the mapped generalized cycles form the constraining subset. Mapping hyperedges of a first generalized cycle, second generalized cycle, etc., may include arranging the images of the first generalized cycle, second generalized cycle, etc., on the mesh, wherein the images are the images under the mesh mapping that is being constructed.

The method includes generating the quantum operation control layout. Generating the quantum operation control layout may be performed by the processor of the system for determining the quantum operation control layout. The quantum operation control layout may be viewed as a control program which, when executed by a quantum processing unit, causes the quantum processing unit to perform quantum operations encoded therein. The quantum operation control layout includes data indicating or representing layout vertices of the mesh. Each layout vertex corresponds to a hyperedge mapped according to the mesh mapping. The quantum operation control layout includes data indicating or representing layout vertex sets. Each layout vertex set consists of layout vertices within a cell of the mesh, the layout vertices corresponding to the elements of a generalized cycle of the constraining subset. The correspondence is provided by the mesh mapping. The mesh mapping is injective, and invertible on its image.

The content and format of the data indicating or representing the layout vertices may be different depending on the information about the quantum system available in the method of determining the quantum operation control layout, and the same may hold for the content and format of the data indicating or representing the layout vertex sets. For instance, if the method had only obtained mesh data, the method may return the mesh and an indication of which vertices of the mesh are layout vertices, and which sets of these vertices form the layout vertex sets. If the method had obtained information about the quantum computation to be performed, such as the information that the quantum computation is to be performed as a digital, gate-based quantum computation with a particular set of gates, the method may return a list of gates to be performed, wherein the list specifies between which constituents the gates are to be performed and in which order. This list would be a quantum operation control layout of a specific content and format that takes the knowledge about the quantum system and about the quantum computation into consideration, but is still data from which layout vertices and layout vertex sets can be derived, and therefore a special form of data indicating or representing the layout vertices/layout vertex sets. The method may include providing information about the type of the quantum computation to be performed. In the method, generating the quantum operation control layout may include adapting the format and/or content of the quantum operation control layout in dependence of the information about the type of the quantum computation to be performed.

The quantum operation control layout may include data associating the layout vertices with the weights of the hyperedges of the hypergraph or of the enlarged hypergraph that are mapped to the layout vertices by the mesh mapping. The quantum operation control layout may include data associating the layout vertex sets with constraining weights. The constraining weights of the layout vertex sets may have the same absolute value or the same value for all layout vertex sets. The constraining weights of layout vertex sets corresponding to regular generalized cycles may be the same. The absolute value of constraining weights of layout vertex sets corresponding to irregular generalized cycles may be same. The value of the constraining weights of some layout vertex sets corresponding to irregular generalized cycles may be the opposite of the value of the constraining weights of some other layout vertex sets corresponding to irregular generalized cycles. A value is the opposite of another value if their sum is zero. The absolute value of the constraining weights may be larger than the absolute value of any weight of the hyperedges of the hypergraph, i.e., larger than $w_{max}$. The absolute value of the constraining weights of the layout vertex sets may be smaller than the absolute value of a special weight associated with a layout vertex corresponding to a special element of a generalized cycle.

The quantum operation control layout may be an intransparent quantum operation control layout. The quantum operation control layout may be a transparent quantum operation control layout. The transparent quantum operation control layout may include data representing the mesh mapping. Additionally or alternatively, the transparent quantum operation control layout may include data representing the generalized cycles of the constraining subset of generalized cycles.

The method may include outputting the quantum operation control layout. Outputting the quantum operation control layout may include storing the quantum operation control layout in a memory and/or transmitting the quantum operation control layout over a network.

According to further embodiments, a quantum operation control layout is provided. According to further embodiments, a computer program product comprising a quantum operation control layout is provided. The quantum operation control layout may be a quantum operation control layout obtained by the method of determining a control layout for a quantum computation on a quantum system according to embodiments described herein. The quantum operation control layout can be the direct product of the method of determining a quantum operation control layout according to embodiments described herein. The computer program product may comprise the quantum operation control layout embodied in machine-readable form, for instance in the form of symbols or bits. The computer program product may be some memory of a classical computing system, an internal or external storage such as hard drives, SSDs, flash memory on cards or sticks, CDs, DVDs. The quantum operation control layout may be embodied as a downloadable symbol stream or bit stream, which may be transmitted over a communications channel, e.g., over a network, to some remote location distant from the system for determining the quantum operation control layout.

The quantum operation control layout may be configured for controlling a quantum computation on a quantum system. The quantum operation control layout may be configured to cause a quantum computing system, when loaded into a memory of the quantum computing system and/or processed by a quantum computing unit, to carry out the quantum computation, in particular a quantum computation in accordance with the method of performing a quantum computation on a quantum system according to embodiments described herein. The quantum computation is to be carried out on constituents of the quantum system arranged in accordance with a mesh. Vertices of the mesh represent possible sites for the constituents of the quantum system. Each cell of the mesh indicates that quantum interactions between constituents of the quantum system arranged in that cell are possible during the quantum computation. The quantum system and its constituents, the mesh and its vertices and cells may have any of the properties described herein.

The quantum operation control layout includes data representing layout vertices of the mesh, and data representing layout vertex sets. Each layout vertex set consists of layout vertices within a cell of the mesh. The layout vertices may correspond to hyperedges of a hypergraph or of an enlarged hypergraph mapped to the layout vertices according to a mesh mapping, wherein layout vertices of each layout vertex set correspond to hyperedges forming a generalized cycle of the hypergraph or of the enlarged hypergraph. The quantum operation control layout may include data representing weights associated with the layout vertices. The weights associated with the layout vertices may correspond to weights of the hyperedges of the hypergraph or of the enlarged hypergraph that are mapped to the layout vertices by the mesh mapping. The quantum operation control layout may include data representing constraining weights associated with the layout vertex sets. All layout vertices may be contained in the union of the layout vertex sets. The quantum operation control layout may include the mesh, data representing the mesh, or data representing at least one information element about the mesh. The layout vertices and layout vertex sets may be specified in relation to the mesh. The mesh, the information element(s) about the mesh, the layout vertices, the layout vertex sets, the hyperedges, the hypergraph, the enlarged hypergraph, the generalized cycles, the mesh mapping, the weights, the constraining weights, and the quantum operation control layout may have any of the properties described herein.

According to further embodiments, a method of performing a quantum computation on a quantum system is provided. The method may be performed by a quantum computing system. The quantum computing system may include a memory, a quantum processing unit (QPU), and a measurement unit. The quantum computation is carried out on constituents of the quantum system. The method includes providing a quantum operation control layout as described herein. Providing the quantum operation control layout may include receiving the quantum operation control layout over a network and/or loading the quantum operation control layout from the memory of the quantum computing system. The method of performing a quantum computation may include the method of determining the quantum operation control layout for the quantum computation as described herein. The method of performing a quantum computation includes providing the constituents of the quantum system in a spatial arrangement such that there is a constituent for every layout vertex of the mesh and such that, for each layout vertex set, quantum interactions are possible between constituents corresponding to layout vertices of that layout vertex set. The quantum system and its constituents, including any arrangement thereof, as well as the mesh, its vertices and cells may have any of the properties described herein.

The method of performing a quantum computation on a quantum system includes applying, for each layout vertex associated with a non-zero weight, a local field to the constituent corresponding to that layout vertex. The method includes performing, for each layout vertex set, quantum interactions between constituents corresponding to the layout vertices of that layout vertex set. The application of local fields and the performance of quantum interactions may be driven by the quantum processing unit of the quantum processing system. The method includes measuring some or all of the constituents of the quantum system. The measurements may be performed by the measurement unit of the quantum processing system. The method of performing a quantum computation may further include any of the features described herein.

According to a further embodiment, a method for solving a computational problem is provided. The computational problem may be a classical computational problem, e.g., an NP-hard or NP-complete computational problem, as described herein. The method may include encoding the computational problem into a hypergraph. The hypergraph may be associated with spin model in that nodes of the hypergraph correspond to spins of the spin model and hyperedges correspond to interactions between the spins of the spin model, and finding the ground state of the spin model may be equivalent to finding the solution of the computational problem. The method may further include obtaining or determining/generating a quantum operation control layout based on the hypergraph. The method for solving the computational problem may include the method of determining the quantum operation control layout as described herein. The method may include performing a quantum computation controlled by the quantum operation control layout. The method for solving the computational problem may include the method of performing the quantum computation as described herein. The method for solving the computational problem may include obtaining the measurement results of the quantum computation as a trial solution and determining if the trial solution is a solution to the computational problem. If not, the method may include repeating the performance of the quantum computation until a solution is found, or repeating the performance of the quantum computation a finite number of times and selecting the best trial solution as an approximate solution of the computational problem. The method for solving a computational problem may be performed by the classical computing system(s) and quantum computing system(s) described herein.

According to further embodiments, a system for determining a quantum operation control layout is provided. The system may be a classical computing system, and may include a processing unit/processor and a memory. The system for determining the quantum operation control layout may be configured for carrying out the method of determining the quantum operation control layout according to embodiments described herein. The components of the system may be configured to carry out individual features of the method, as described herein. Additionally, a system for performing a quantum computation is provided. The system for performing the quantum computation may be a quantum processing system, and may include a quantum processing unit, a measurement unit, and any other component as described herein. The system and its components may be configured for carrying out the method or the individual features of the method for performing a quantum computation according to embodiments described herein. The system for performing the quantum computation may be configured to perform the quantum computation under the control of the quantum operation control layout described herein, when the quantum operation control layout is loaded into a memory of the system and/or processed by the quantum processing unit. An embodiment is directed to the quantum operation control layout according to embodiment described herein, which, when executed as a control program by the system for performing the quantum computation, causes this system to carry out the method of performing the quantum computation described herein. Further, a system for solving a computational problem is provided, wherein the system may include at least one classical computing system for encoding the computational problem into a hypergraph, for determining a quantum operation control layout, and for determining if measurement results of a quantum computation contain a solution to the computational problem, and may include a quantum computing system for performing a quantum computation on a quantum system that is controlled by the quantum operation control layout. The system for solving the computational problem and its components may be configured to carry out the method for solving the computational problem, and the individual features of that method, as described herein. Further embodiments are directed to the use of the system for determining the quantum operation control layout to perform the method of determining the quantum operation control layout in accordance with the embodiments described herein, to the use of the system for performing a quantum computation on a quantum system to perform the method of performing the quantum computation as described herein, and to the use of the system for solving a computational problem to perform the method of solving the computational problem as described herein.

While the foregoing is directed to embodiments, other and further embodiments may be devised without departing from the scope determined by the claims.

The invention claimed is:

1. A method of determining a quantum operation control layout for a quantum computation on a quantum system, wherein the quantum computation is to be carried out on constituents of the quantum system arranged in accordance with a mesh, wherein vertices of the mesh represent possible sites for the constituents of the quantum system and each cell of the mesh indicates that quantum interactions between constituents of the quantum system arranged in that cell are possible during the quantum computation, the method comprising:

providing a data set including data representing hyper-edges of a hypergraph;

determining a set of generalized cycles, the generalized cycles containing hyperedges of the hypergraph or containing hyperedges of an enlarged hypergraph, the enlarged hypergraph at least including the hyperedges of the hypergraph and an additional hyperedge, wherein a maximal length of generalized cycles of the set of generalized cycles is not greater than a maximal vertex number of the cells of the mesh;

determining a mesh mapping that maps data representing the hyperedges of the hypergraph or of the enlarged hypergraph to the vertices of the mesh, wherein each generalized cycle of a constraining subset of the set of generalized cycles consists of hyperedges mapped to a cell of the mesh; and generating the quantum operation control layout, the quantum operation control layout including data indicating layout vertices of the mesh, wherein each layout vertex corresponds to a hyperedge mapped according to the mesh mapping, and including data indicating layout vertex sets, each layout vertex set consisting of layout vertices within a cell of the mesh that correspond to a generalized cycle of the constraining subset of generalized cycles.

2. The method of claim 1, wherein the mesh is two-dimensional.

3. The method of claim 1, wherein the lengths of the generalized cycles of the set of generalized cycles are in the range from three to the maximal vertex number of the cells of the mesh, or are equal to the maximal vertex number of the cells of the mesh.

4. The method of claim 1, wherein the number of nodes of the hypergraph is N, the number of hyperedges of the hypergraph is K, and the cardinality of the constraining subset is at least K−N.

5. The method of claim 1, wherein the number of nodes of the hypergraph is N, the number of hyperedges of the hypergraph is K, and wherein K is smaller than $N(N-1)/2$.

6. The method of claim 1, wherein the hyperedges of the hypergraph are associated with weights, and the quantum operation control layout includes data associating the layout vertices with the weights of the hyperedges of the hypergraph or of the enlarged hypergraph that are mapped to the layout vertices by the mesh mapping, wherein additional hyperedges of the enlarged hypergraph not contained in the hypergraph are assigned a weight of zero.

7. The method of claim 1, wherein the quantum operation control layout is a transparent quantum operation control layout which includes at least one of: data representing the mesh mapping and data representing the generalized cycles of the constraining subset of generalized cycles.

8. The method of claim 1, wherein the union of generalized cycles of the constraining subset of generalized cycles contains all hyperedges of the hypergraph or of the enlarged hypergraph and/or wherein the generalized cycles of the constraining subset of generalized cycles connect all hyperedges of the hypergraph or of the enlarged hypergraph.

9. The method of claim 1, wherein the cardinality of at least one hyperedge of the hypergraph is odd and/or wherein the cardinality of at least one hyperedge of the hypergraph is at least three.

10. The method of claim 1, wherein the constraining subset includes at least one of: a regular generalized cycle and an irregular generalized cycle.

11. The method of claim 1, wherein the mesh mapping is constructed by mapping the hyperedges of a first generalized cycle of the set of generalized cycles on vertices of a cell of the mesh, mapping the hyperedges of a second generalized cycle of the set of generalized cycles on the vertices of a neighboring cell of the mesh, wherein the first generalized cycle and the second generalized cycle have at least one hyperedge in common and the at least one hyperedge is mapped on a corresponding at least one vertex of the mesh, and repeating this process of mapping hyperedges of generalized cycles of the set of generalized cycles until the mapped generalized cycles form the constraining subset.

12. The method of claim 1, comprising at least one of:

(a) providing mesh data that represents the mesh or includes at least one information element about the mesh, and deriving the mesh from the mesh data, where default values are used where information about the mesh is lacking; and (b) providing information about the type of the quantum computation to be performed, wherein generating the quantum operation control layout includes adapting the format and/or content of the quantum operation control layout in dependence of the information about the type of the quantum computation to be performed.

13. A quantum operation control layout for controlling a quantum computation on a quantum system, wherein the quantum computation is to be carried out on constituents of the quantum system arranged in accordance with a mesh, wherein vertices of the mesh represent possible sites for the constituents of the quantum system and each cell of the mesh indicates that quantum interactions between constituents of the quantum system arranged in that cell are possible during the quantum computation, the quantum operation control layout comprising:

data indicating layout vertices of the mesh, and data indicating layout vertex sets, wherein each layout vertex set consists of layout vertices within a cell of the mesh.

14. The quantum operation control layout according to claim 13, wherein at least one of the following applies:

the quantum operation control layout comprises data representing weights associated with the layout vertices;

the layout vertices correspond to hyperedges of a hypergraph or of an enlarged hypergraph mapped to the layout vertices according to a mesh mapping, wherein layout vertices of each layout vertex set correspond to hyperedges forming a generalized cycle of the hypergraph or of the enlarged hypergraph; and the weights associated with the layout vertices correspond to weights of the hyperedges of the hypergraph or of the enlarged hypergraph mapped to the layout vertices by the mesh mapping.

15. A method of performing a quantum computation on a quantum system, wherein the quantum computation is carried out on constituents of the quantum system, the method comprising:

providing a quantum operation control layout for controlling the quantum computation on the quantum system, wherein the quantum computation is to be carried out on constituents of the quantum system arranged in accordance with a mesh, wherein vertices of the mesh represent possible sites for the constituents of the quantum system and each cell of the mesh indicates that quantum interactions between constituents of the quantum system arranged in the cell are possible during the quantum computation, the quantum operation control layout comprising:

data indicating layout vertices of the mesh, and data indicating layout vertex sets, wherein each layout vertex set consists of layout vertices within a cell of the mesh;

the method further comprising:

providing the constituents of the quantum system in a spatial arrangement such that there is a constituent for every layout vertex of the mesh and, for each layout vertex set, quantum interactions are possible between constituents corresponding to layout vertices of that layout vertex set;

for each layout vertex associated with a non-zero weight, applying a local field to the constituent corresponding to that layout vertex;

for each layout vertex set, performing quantum interactions between constituents corresponding to the layout vertices of that layout vertex set; and measuring some or all of the constituents of the quantum system.

16. A method of performing a quantum computation on a quantum system, wherein the quantum computation is carried out on constituents of the quantum system, the method comprising:

providing a quantum operation control layout for controlling the quantum computation on the quantum system, wherein the quantum computation is to be carried out on constituents of the quantum system arranged in accordance with a mesh, wherein vertices of the mesh represent possible sites for the constituents of the quantum system and each cell of the mesh indicates that quantum interactions between constituents of the quantum system arranged in that cell are possible during the quantum computation, the quantum operation control layout comprising:

data indicating layout vertices of the mesh, and data indicating layout vertex sets, wherein each layout vertex set consists of layout vertices within a cell of the mesh, wherein at least one of the following applies:

the quantum operation control layout comprises data representing weights associated with the layout vertices;

the layout vertices correspond to hyperedges of a hypergraph or of an enlarged hypergraph mapped to the layout vertices according to a mesh mapping, wherein layout vertices of each layout vertex set correspond to hyperedges forming a generalized cycle of the hypergraph or of the enlarged hypergraph; and the weights associated with the layout vertices correspond to weights of the hyperedges of the hypergraph or of the enlarged hypergraph mapped to the layout vertices by the mesh mapping;

the method further comprising:

providing the constituents of the quantum system in a spatial arrangement such that there is a constituent for every layout vertex of the mesh and, for each layout vertex set, quantum interactions are possible between constituents corresponding to layout vertices of that layout vertex set;

for each layout vertex associated with a non-zero weight, applying a local field to the constituent corresponding to that layout vertex;

for each layout vertex set, performing quantum interactions between constituents corresponding to the layout vertices of that layout vertex set; and measuring some or all of the constituents of the quantum system.

* * * * *